United States Patent
Onuki

(10) Patent No.: US 12,384,277 B2
(45) Date of Patent: Aug. 12, 2025

(54) ALTERNATING CURRENT GENERATION CIRCUIT AND TEMPERATURE RAISING DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 585 days.

(21) Appl. No.: 17/896,111

(22) Filed: Aug. 26, 2022

(65) Prior Publication Data

US 2023/0064126 A1 Mar. 2, 2023

(30) Foreign Application Priority Data

Sep. 1, 2021 (JP) .................................. 2021-142596

(51) Int. Cl.
  *B60L 58/27* (2019.01)
  *H01M 10/615* (2014.01)
  *H01M 10/625* (2014.01)

(52) U.S. Cl.
  CPC .......... *B60L 58/27* (2019.02); *H01M 10/615* (2015.04); *H01M 10/625* (2015.04)

(58) Field of Classification Search
  CPC ... B60L 58/27; H01M 10/615; H01M 10/625; Y02E 60/10
  USPC ........................................................ 320/104
  See application file for complete search history.

(56) References Cited

U.S. PATENT DOCUMENTS

| 12,074,305 B2 * | 8/2024 | Onuki | H01M 10/615 |
| 2013/0108896 A1 * | 5/2013 | Daniel | H01M 10/647 |
| | | | 429/50 |
| 2021/0221254 A1 * | 7/2021 | Abe | B60L 58/26 |

FOREIGN PATENT DOCUMENTS

| CN | 110544808 A | * 12/2019 | ............ B60L 58/25 |
| JP | 2000-228231 | 8/2000 | |
| JP | 2011-146183 | 7/2011 | |
| JP | 2013-077452 | 4/2013 | |

(Continued)

OTHER PUBLICATIONS

Japanese Notice of Allowance for Japanese Patent Application No. 2021-142596 mailed Nov. 12, 2024.

*Primary Examiner* — M Baye Diao
(74) *Attorney, Agent, or Firm* — Amin, Turocy & Watson, LLP

(57) ABSTRACT

An AC generation circuit includes a first capacitor having a first end connected to a positive electrode side of a power storage having an inductance component, a second capacitor having a first end connected to a negative electrode side of the power storage, a parallel switch unit configured to connect the first capacitor and the second capacitor to the power storage in parallel by connecting a second end of the first capacitor and the first end of the second capacitor and connecting the first end of the first capacitor and a second end of the second capacitor in accordance with a first control signal, a series switch unit configured to connect the first capacitor and the second capacitor to the power storage in series by connecting the second end of the first capacitor and the second end of the second capacitor in accordance with a second control signal, and an inductor connected between both terminals of the series switch unit.

9 Claims, 15 Drawing Sheets

(56) References Cited

FOREIGN PATENT DOCUMENTS

JP 5293820 9/2013

\* cited by examiner

ALTERNATING CURRENT GENERATION CIRCUIT AND TEMPERATURE RAISING DEVICE

CROSS-REFERENCE TO RELATED APPLICATION

Priority is claimed on Japanese Patent Application No. 2021-142596, filed Sep. 1, 2021, the content of which is incorporated herein by reference.

BACKGROUND OF THE INVENTION

Field of the Invention

The present invention relates to an alternating current (AC) generation circuit and the temperature raising device.

Description of Related Art

Efforts are underway to reduce adverse effects on the global environment (for example, reduction of $NO_x$ and $SO_x$ and reduction of $CO_2$). Thus, in recent years, from the viewpoint of improving the global environment, for reduction of $CO_2$, there is growing interest in at least electric vehicles allowed to travel with electric motors driven by power supplied by batteries (secondary batteries) such as, for example, a hybrid electric vehicle (HEV) and a plug-in hybrid vehicle (PHEV). The use of a lithium-ion secondary battery is being considered as a battery for in-vehicle use. In these electric vehicles, it is important to fully bring out the performance of the secondary battery. It is known that the charging/discharging performance of a secondary battery deteriorates when the temperature at the time of use drops below an appropriate range. It is possible to limit the deterioration of the charging/discharging performance of the secondary battery by raising the temperature to a suitable temperature at the time of use.

In relation to this, for example, Japanese Patent No. 5293820 discloses technology related to a temperature raising device for raising the temperature of a secondary battery. In the temperature raising device disclosed in Japanese Patent No. 5293820, the temperature of the secondary battery is raised by positively generating a ripple current of a prescribed frequency of a frequency range in which an absolute value of impedance is relatively decreased in the secondary battery on the basis of frequency characteristics of impedance of the secondary battery.

SUMMARY OF THE INVENTION

However, in the conventional technology, it may not be possible to raise the temperature of the secondary battery efficiently.

The present invention has been made on the basis of the above recognition of the problems and an objective of the present invention is to provide an AC generation circuit and a temperature raising device capable of improving the energy efficiency by raising the temperature of a secondary battery more efficiently.

An AC generation circuit and a temperature raising device according to the present invention adopt the following configurations.

(1): According to an aspect of the present invention, there is provided an AC generation circuit for raising the temperature of a power storage by generating an AC current based on electric power stored in the power storage having an inductance component, the AC generation circuit including: a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor in accordance with a first control signal; a series switch unit configured to connect the first capacitor and the second capacitor to the power storage in series by connecting the second end of the first capacitor and the second end of the second capacitor in accordance with a second control signal; and an inductor connected between both terminals of the series switch unit.

(2): In the above-described aspect (1), the parallel switch unit includes a first switch having a first terminal connected to the second end of the first capacitor and a second terminal connected to the first end of the second capacitor; and a second switch having a first terminal connected to the first end of the first capacitor and a second terminal connected to the second end of the second capacitor, wherein the series switch unit includes a third switch having a first terminal connected to the second end of the second capacitor and a second terminal connected to the second end of the first capacitor, and wherein the inductor is connected in parallel between the first terminal of the third switch and the second terminal of the third switch.

(3): In the above-described aspect (2), inductance of the inductor is approximately one-third of the inductance component.

(4): In the above-described aspect (1), the parallel switch unit includes a first switch having a first terminal connected to the second end of the first capacitor and a second terminal connected to the first end of the second capacitor; and a second switch having a first terminal connected to the first end of the first capacitor and a second terminal connected to the second end of the second capacitor, the series switch unit includes a third switch having a first terminal connected to the second end of the second switch and a second terminal connected to the second end of the first capacitor; and a fourth switch having a first terminal connected to the second end of the second capacitor and a second terminal connected to the first terminal of the first switch, and the inductor includes a first inductor having a first end connected to the first terminal of the fourth switch and a second end connected to the second terminal of the third switch; a second inductor having a first end connected to the first end of the first inductor and a second end connected between the second terminal of the second switch and the first terminal of the third switch; and a third inductor having a first end connected between the first terminal of the first switch and the second terminal of the fourth switch and a second end connected to the second end of the first inductor.

(5): In the above-described aspect (4), the inductance of the first inductor is approximately one-third of the inductance component.

(6): In the above-described aspect (5), the inductance of the second inductor is equal to the inductance of the third inductor.

(7): In the above-described aspect (1), the inductance component includes an inductance component provided in a wiring portion between the power storage and the AC generation circuit.

(8): According to an aspect of the present invention, there is provided a temperature raising device including: the AC generation circuit according to the above-described aspect (1); and a controller configured to output a signal of a prescribed duty ratio for setting the parallel switch unit in a conductive state or a non-conductive state as the first control signal, output a signal of the prescribed duty ratio for setting the series switch unit in the conductive state or the non-conductive state as the second control signal, and alternately switch the state between a first state in which the parallel switch unit is in the conductive state and the series switch unit is in the non-conductive state and a second state in which the parallel switch unit is in the non-conductive state and the series switch unit is in the conductive state according to the first control signal and the second control signal.

(9): In the above-described aspect (8), the prescribed duty ratio is approximately 50 percent.

According to the above-described aspects (1) to (9), it is possible to improve the energy efficiency by raising the temperature of a secondary battery more efficiently.

DETAILED DESCRIPTION OF THE INVENTION

Hereinafter, embodiments of an AC generation circuit and a temperature raising device of the present invention will be described with reference to the drawings. As used throughout this disclosure, the singular forms "a," "an," and "the" include a plurality of references unless the context clearly dictates otherwise.

[Configuration of Vehicle]

Figure 1:
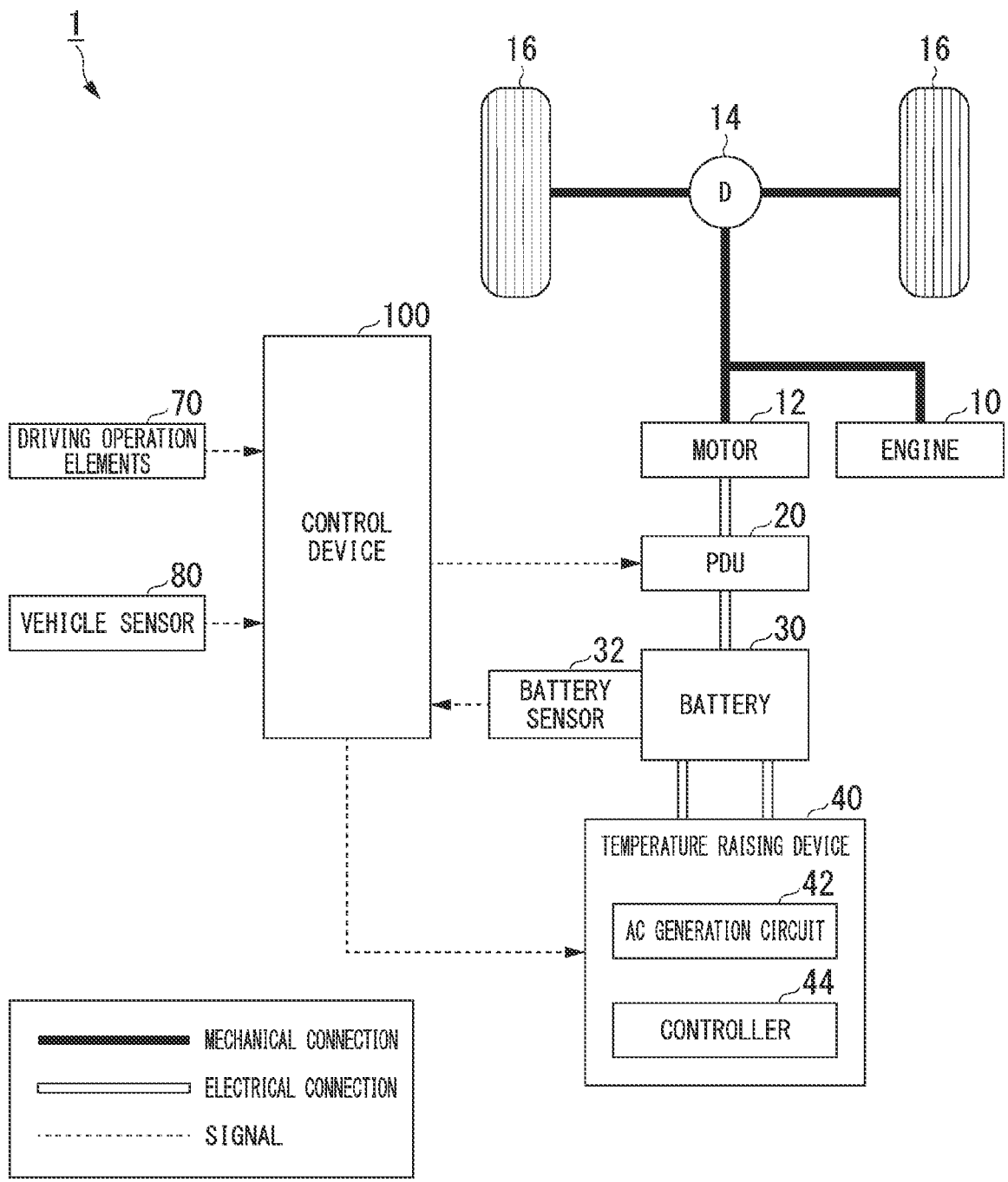
FIG. 1 is a diagram showing an example of a configuration of a vehicle in which a temperature raising device according to an embodiment is adopted.

FIG. 1 is a diagram showing an example of a configuration of a vehicle in which a temperature raising device according to an embodiment is adopted. A vehicle 1 is a hybrid electric vehicle (HEV) (hereinafter simply referred to as a "vehicle") that travels by combining driving of an electric motor driven using electric power supplied from a battery (a secondary battery) for traveling and driving of an internal combustion engine using fuel as an energy source, such as, for example, a diesel engine or a gasoline engine. Vehicles to which the present invention is applied may be, for example, general vehicles such as four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by power supplied from a battery for traveling such as an assisted bicycle. The vehicle 1 may be, for example, an electric vehicle (EV) that travels according to driving of only an electric motor.

The vehicle 1 includes, for example, an engine 10, a motor 12, a speed reducer 14, drive wheels 16, a power drive unit (PDU) 20, a battery 30, a battery sensor 32, a temperature raising device 40, driving operation elements 70, a vehicle sensor 80, and a control device 100.

The engine 10 is an internal combustion engine that outputs motive power by burning fuel, for example, such as light oil or gasoline, stored in a fuel tank (not shown) of the vehicle 1 and operating (rotating) the engine 10. The engine 10 is a reciprocating engine including, for example, a cylinder and a piston, an intake valve, an exhaust valve, a fuel injection device, an ignition plug, a conrod, a crankshaft, and the like. The engine 10 may be a rotary engine. The rotational power of the engine 10 is transferred to the speed reducer 14.

The motor 12 is an electrical rotating machine for traveling of the vehicle 1. The motor 12 is, for example, a three-phase AC motor. The rotor of the motor 12 is connected to the speed reducer 14. The motor 12 is driven (rotated) by electric power supplied from the battery 30 via the PDU 20. The rotational power of the motor 12 is transferred to the speed reducer 14. The motor 12 may operate as a regenerative brake using kinetic energy of the vehicle 1 during deceleration to generate electric power. The motor 12 may include an electric motor for power generation. The electric motor for power generation uses, for example, the rotational power output by the engine 10 to generate electric power.

The speed reducer 14 is, for example, a differential gear. The speed reducer 14 allows a driving force of the shaft to which the engine 10 and the motor 12 are connected, i.e., the rotational power of the engine 10 and the motor 12, to be transferred to the axle to which the drive wheels 16 are connected. The speed reducer 14 may include, for example, a so-called transmission mechanism in which a plurality of gears or shafts are combined to change the rotational speed of the engine 10 or the motor 12 in accordance with a gear ratio and allow the rotational speed to be transferred to the axle. The speed reducer 14 may also include, for example, a clutch mechanism that directly connects or separates the rotational power of the engine 10 or the motor 12 to or from the axle.

The PDU 20 is, for example, an inverter, a direct current (DC)-DC converter, or an AC-DC converter. The PDU 20 converts the DC power supplied from the battery 30 into three-phase AC power for driving the motor 12 and outputs the AC power to the motor 12. The PDU 20 may include, for example, a voltage control unit (VCU) that boosts the DC power supplied from the battery 30. The PDU 20 converts the three-phase AC power generated by the motor 12 operating as a regenerative brake into DC power and outputs the DC power to the battery 30. The voltage of the PDU 20 may be boosted or lowered in accordance with the power output destination and the boosted or lowered voltage may be output. Although the components of the PDU 20 are shown as a single unitary configuration in FIG. 1, this is only an example and the components provided in the PDU 20 may be decentralized and arranged in the vehicle 1.

The battery 30 is a battery for traveling of the vehicle 1. The battery 30 is, for example, a battery including a secondary battery capable of iteratively being charged and discharged as a power storage unit such as a lithium-ion battery. The battery 30 may have a configuration that can be easily attached to and detached from the vehicle 1, such as a cassette type battery pack, or may have a stationary configuration that is not easily attached to and detached from the vehicle 1. The secondary battery provided in the battery 30 is, for example, a lithium-ion battery. Although, for example, a capacitor such as an electric double layer capacitor, a composite battery in which a secondary battery and a capacitor are combined, and the like as well as a lead storage battery, a nickel-hydrogen battery, a sodium ion battery, and the like can be considered for the secondary battery provided in the battery 30, the secondary battery may have any configuration. The battery 30 stores (is charged with) electric power introduced from an external charger (not shown) of the vehicle 1 and is discharged to supply the stored power such that the vehicle 1 is allowed to travel. The battery 30 stores (is charged with) the electric power generated by the motor 12 operated as a regenerative brake supplied via the PDU 20 and is discharged to supply the stored electric power for traveling (for example, accelerating) of the vehicle 1. The battery 30 has at least an inductance component.

The battery 30 is an example of a "power storage" in the claims and the inductance component connected to the power storage unit provided in the battery 30 is an example of an "inductance component" in the claims.

A battery sensor 32 is connected to the battery 30. The battery sensor 32 detects physical quantities such as a voltage, a current, and the temperature of the battery 30. The battery sensor 32 includes, for example, a voltage sensor, a current sensor, and a temperature sensor. The battery sensor 32 detects the voltage of the battery 30 using the voltage sensor, detects the current of the battery 30 using the current sensor, and detects the temperature of the battery 30 using the temperature sensor. The battery sensor 32 outputs information such as a detected voltage value, current value, and temperature of the battery 30 (hereinafter referred to as "battery information") to the control device 100.

The temperature raising device 40 raises the temperature of the battery 30 in accordance with control from the control device 100. The temperature raising device 40 includes, for example, an AC generation circuit 42 and a controller 44.

The AC generation circuit 42 includes, for example, a first capacitor connected to a positive electrode side of the battery 30, a second capacitor connected to a negative electrode side of the battery 30, a parallel switch unit in which the first capacitor and the second capacitor are connected to the battery 30 in parallel, a series switch unit in which the first capacitor and the second capacitor are connected to the battery 30 in series, and an inductor connected between both terminals of the series switch unit. The AC generation circuit 42 generates an AC current using a resonance operation between the inductance component provided in the battery 30 and at least the first capacitor. More specifically, the AC generation circuit 42 generates an AC current based on electric power stored in the battery 30 according to a resonance operation in which magnetic energy stored in the inductance component provided in the battery 30 and electrostatic energy stored in at least the first capacitor are alternately exchanged. The AC generation circuit 42 raises the temperature of the battery 30 by applying the generated AC current to the battery 30 (allowing the generated AC current to flow through the battery 30).

The controller 44 switches the connection of the first capacitor and the second capacitor to the battery 30 to either the parallel connection or the serial connection by setting each of the parallel switch unit and the series switch unit provided in the AC generation circuit 42 in a conductive state or a non-conductive state. More specifically, the controller 44 alternately switches the state between a state in which the first capacitor and the second capacitor are connected to the battery 30 in parallel by setting the parallel switch unit in the conductive state and setting the series switch unit in the non-conductive state and a state in which the first capacitor and the second capacitor are connected to the battery 30 in series by setting the parallel switch unit in the non-conductive state and setting the series switch unit in the conductive state. At this time, the controller 44 may provide a period during which both the parallel switch unit and the series switch unit are in the non-conductive state, i.e., a so-called dead time, and switch the connection of the first capacitor and the second capacitor to the battery 30 from a parallel connection to a series connection or vice versa.

A state in which the first capacitor and the second capacitor are connected to the battery 30 in parallel is an example of a "first state" in the claims and a state in which the first capacitor and the second capacitor are connected to the battery 30 in series is an example of a "second state" in the claims. Details of the temperature raising device 40 and the components provided in the temperature raising device 40 will be described below.

The driving operation elements 70 include, for example, an accelerator pedal, a brake pedal, a shift lever, a steering wheel, a variant steering wheel, a joystick, and other operation elements. The driving operation element 70 is equipped with a sensor that detects the presence or absence of an operation of a user (a driver) of the vehicle 1 on each operation element or an amount of operation. The driving operation element 70 outputs a detection result of the sensor to the control device 100.

The vehicle sensor 80 detects a traveling state of the vehicle 1. The vehicle sensor 80 includes, for example, a vehicle speed sensor that detects the speed of the vehicle 1 and an acceleration sensor that detects the acceleration of the vehicle 1. The vehicle sensor 80 outputs a detection result detected by each sensor to the control device 100.

The control device 100 controls an operation of the engine 10 or the motor 12 in accordance with a detection result output by each sensor provided in the driving operation element 70, i.e., an operation of the user (the driver) of the vehicle 1 on each operation element. In other words, the control device 100 controls a driving force of the motor 12. The control device 100 may include, for example, separate control devices such as an engine control unit, a motor control unit, a battery control unit, a PDU control unit, and a VCU control unit. For example, the control device 100 may be replaced with a control device such as an engine electronic control unit (ECU), a motor ECU, a battery ECU, a PDU-ECU, or a VCU-ECU.

The control device 100 controls a supply amount of AC power supplied from the battery 30 to the motor 12 and the frequency (i.e., a voltage waveform) of the AC power to be supplied when the vehicle 1 travels. At this time, the control device 100 controls the activation of the temperature raising device 40 on the basis of information of the temperature of the battery 30 included in the battery information output by the battery sensor 32. That is, the control device 100 controls the activation or stopping of the temperature raising device 40 such that the temperature of the battery 30 is increased (raised) to a temperature suitable for use to limit the deterioration of the charging/discharging performance of the battery 30.

The control device 100 operates, for example, when a hardware processor such as a central processing unit (CPU) executes a program (software). The control device 100 may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The control device 100 may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in the drive device provided in the vehicle 1.

First Embodiment

[Configuration of AC Generation Circuit Provided in Temperature Raising Device]

Figure 2:
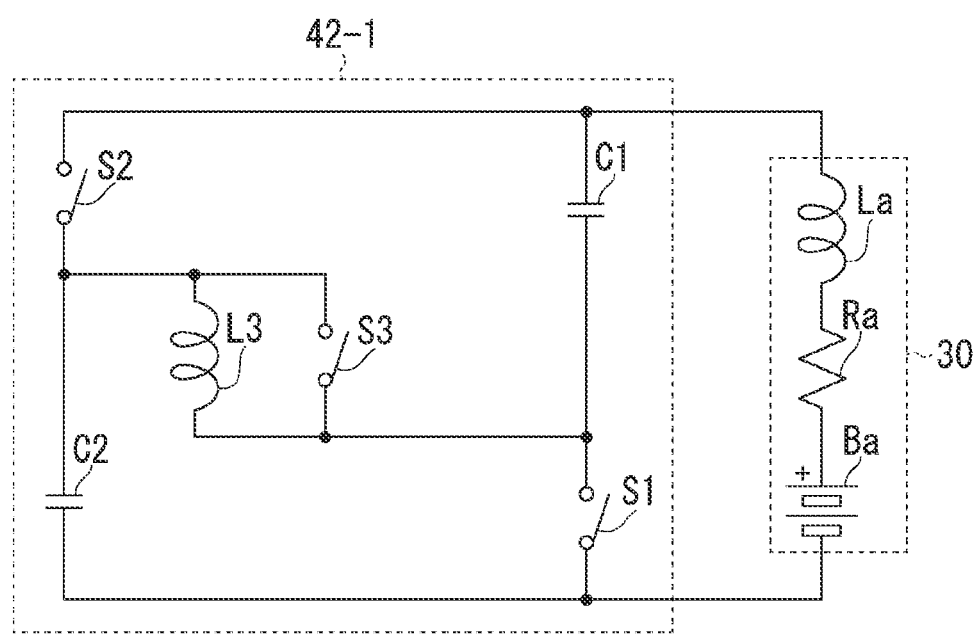
FIG. 2 is a diagram showing an example of a configuration of an AC generation circuit provided in the temperature raising device according to a first embodiment.

FIG. 2 is a diagram showing an example of a configuration of an AC generation circuit 42 (hereinafter referred to as an "AC generation circuit 42-1") provided in the temperature raising device 40 according to a first embodiment. In FIG. 2, a battery 30 related to the AC generation circuit 42-1 is also shown. In the battery 30, for example, resistance Ra and inductance La are connected to a positive electrode side of a power storage unit Ba in series. The inductance La connected to the power storage unit Ba provided in the battery 30 is an example of an "inductance component" in the claims.

The AC generation circuit 42-1 includes, for example, a capacitor C1, a capacitor C2, a switch S1, a switch S2, a switch S3, and an inductor L3. The capacitor C1 and the capacitor C2 are capacitors having the same capacitance. Control is performed such that each of the switch S1, the switch S2, and the switch S3 is in a conductive state (a closed state) in which a connection between both terminals thereof is made or a non-conductive state (an open state) in which the connection between both terminals thereof is disconnected in accordance with a control signal output by the controller 44. In the following description, a control signal for controlling the switch S1 output by the controller 44 such that it is in the conductive state or the non-conductive state is referred to as a "control signal CS1," a control signal for controlling the switch S2 such that it is in the conductive state or the non-conductive state is referred to as a "control signal CS2," and a control signal for controlling the switch S3 such that it is in the conductive state or the non-conductive state is referred to as a "control signal CS3."

Each of the switch S1, the switch S2, and the switch S3 may be a semiconductor switching element that is controlled such that it is in an ON state or an OFF state such as, for example, an N-channel type metal oxide semiconductor field effect transistor (MOSFET). In this case, for example, a configuration in which diodes functioning as freewheeling diodes are further connected in parallel may be adopted. When each of the switch S1, the switch S2, and the switch S3 is composed of a semiconductor switching element, the controller 44 outputs a gate signal for setting the semiconductor switching element in the ON state or the OFF state as a control signal for controlling each of the switch S1, the switch S2, and the switch S3 such that it is in the conductive state or the non-conductive state.

In the AC generation circuit 42-1, a first end of the capacitor C1 is connected to the positive electrode side of the battery 30 and a first end of the capacitor C2 is connected to the negative electrode side of the battery 30. Further, in the AC generation circuit 42-1, a first terminal of the switch S2 is connected to the first end of the capacitor C1 and a second terminal of the switch S1 is connected to the first end of the capacitor C2. In the AC generation circuit 42-1, the first terminal of the switch S1 and a second terminal of the switch S3 are connected to a second end of the capacitor C1 and a second terminal of the switch S2 and a first terminal of the switch S3 are connected to a second end of the capacitor C2. Further, in the AC generation circuit 42-1, the inductor L3 is connected in parallel between the first terminal and the second terminal of the switch S3.

According to such a configuration, in the AC generation circuit 42-1, the capacitor C1 and the capacitor C2 are connected in parallel or in series between the positive electrode side and the negative electrode side of the battery 30 in accordance with control from the controller 44. More specifically, the controller 44 allows the capacitor C1 and the capacitor C2 to be connected in parallel between the positive electrode side and the negative electrode side of the battery 30 by outputting a control signal CS1 for setting the switch S1 in the conductive state to the switch S1, outputting a control signal CS2 for setting the switch S2 in the conductive state to the switch S2, and outputting a control signal CS3 for setting the switch S3 in the non-conductive state to the switch S3. On the other hand, the controller 44 allows the capacitor C1 and the capacitor C2 to be connected in series between the positive electrode side and the negative electrode side of the battery 30 by outputting a control signal CS1 for setting the switch S1 in the non-conductive state to the switch S1, outputting a control signal CS2 for setting the switch S2 in the non-conductive state to the switch S2, and outputting a control signal CS3 for setting the switch S3 in the conductive state to the switch S3.

In the AC generation circuit 42-1, the capacitor C1 is an example of a "first capacitor" in the claims and the capacitor C2 is an example of a "second capacitor" in the claims. In the AC generation circuit 42-1, a configuration in which the switch S1 and the switch S2 are combined is an example of a "parallel switch unit" in the claims and the switch S3 is an example of a "series switch unit" in the claims. In the AC generation circuit 42-1, the switch S1 is an example of a "first switch" in the claims, the switch S2 is an example of a "second switch" in the claims, and the switch S3 is an example of a "third switch" in the claims. In the AC generation circuit 42-1, the inductor L3 is an example of an "inductor" in the claims. The control signal CS1 output to the switch S1 by the controller 44 and the control signal CS2 output to the switch S2 are examples of a "first control signal" in the claims and the control signal CS3 output to the switch S3 by the controller 44 is an example of a "second control signal" in the claims. In the AC generation circuit 42-1, a state in which the capacitor C1 and the capacitor C2 are connected in parallel between the positive electrode side and the negative electrode side of the battery 30 is an example of a "first state" in the claims and a state in which the capacitor C1 and the capacitor C2 are connected in series between the positive electrode side and the negative electrode side of the battery 30 is an example of a "second state" in the claims.

[Operation of Temperature Raising Device]

Here, the frequency of an AC current generated by the AC generation circuit 42-1 is considered. It is preferable that the current waveform of the AC current generated by the AC generation circuit 42-1 be a sinusoidal wave such that the temperature of the battery 30 is efficiently raised by the temperature raising device 40. From the viewpoint of control for allowing the AC generation circuit 42-1 to generate an AC current, it is preferable that the duty ratio of the control signal output to each of the switch S1, the switch S2, and the switch S3 by the controller 44 be 50 percent (%).

By the way, as described above, in the AC generation circuit 42-1, the capacitor C1 and the capacitor C2 are capacitors having the same capacitance. Thus, in the AC generation circuit 42-1, the total capacitance when the capacitor C1 and the capacitor C2 are considered as one capacitor is different between a case where the capacitor C1 and the capacitor C2 are connected to the battery 30 in series and a case where the capacitor C1 and the capacitor C2 are connected to the battery 30 in parallel. More specifically, the total capacitance of the AC generation circuit 42-1 when the capacitor C1 and the capacitor C2 are connected in series is a sum of reciprocals of capacitance values of the capacitors, i.e., capacitance multiplied by ½. On the other hand, the total capacitance of the AC generation circuit 42-1 when the capacitor C1 and the capacitor C2 are connected in parallel is a sum of the capacitance values of the capacitors, i.e., capacitance multiplied by 2. Thus, in the AC generation circuit 42-1, the frequency of the generated AC current is different between a case where the capacitor C1 and the capacitor C2 are connected to the battery 30 in series and a case where the capacitor C1 and the capacitor C2 are connected to the battery 30 in parallel.

Figure 3:
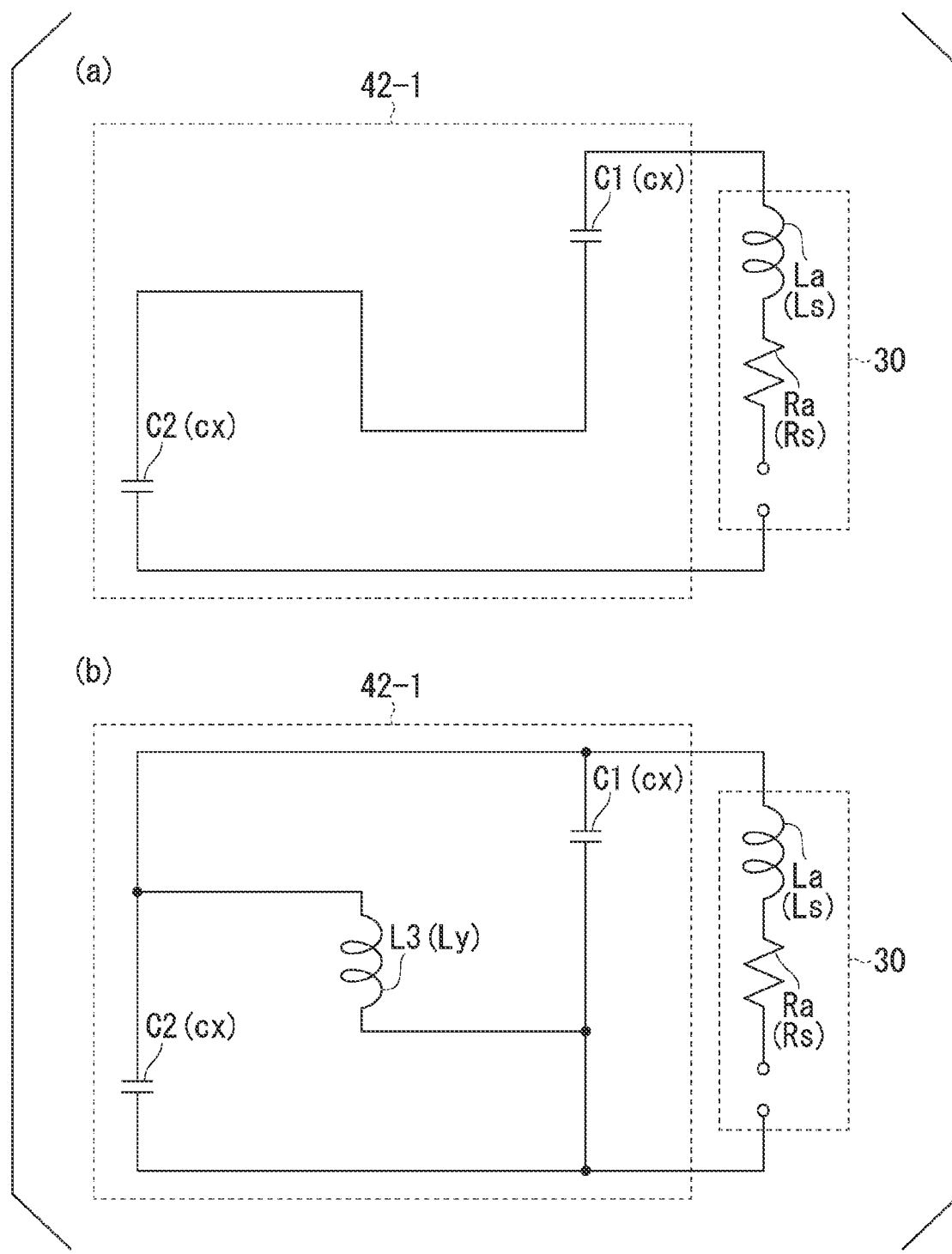
FIG. 3 is an example of a circuit equivalent to the AC generation circuit of the first embodiment.

FIG. 3 is an example of a circuit equivalent to the AC generation circuit 42-1 of the first embodiment. An equivalent circuit when the capacitor C1 and the capacitor C2 are connected to the battery 30 in series is shown in (a) of FIG. 3 and an equivalent circuit when the capacitor C1 and the capacitor C2 are connected to the battery 30 in parallel is shown in (b) of FIG. 3. In FIG. 3, an inductance component of the inductance La provided in the battery 30 is denoted by "Ls" and a resistance component of the resistance Ra is denoted by "Rs." The capacitance of the capacitors C1 and C2 is denoted by "Cx" and the inductance of the inductor L3 is denoted by "Ly."

As shown in (a) of FIG. 3, when the capacitor C1 and the capacitor C2 are connected to the battery 30 in series in the AC generation circuit 42-1, the inductor L3 is short-circuited by the switch S3. On the other hand, when the capacitor C1 and the capacitor C2 are connected in parallel to the battery 30 in the AC generation circuit 42-1, the inductor L3 is arranged between the capacitor C1 and the capacitor C2. In this way, it is possible to make a current waveform of a generated AC current closer to a sinusoidal wave and facilitate each switch control process of the controller 44 (make the duty ratio of the control signal output by the controller 44 close to 50%) by arranging the inductor L3 when the capacitor C1 and the capacitor C2 are connected in parallel in the AC generation circuit 42-1.

Comparative Examples

Configuration of AC Generation Circuit in Comparative Example

Figure 4:
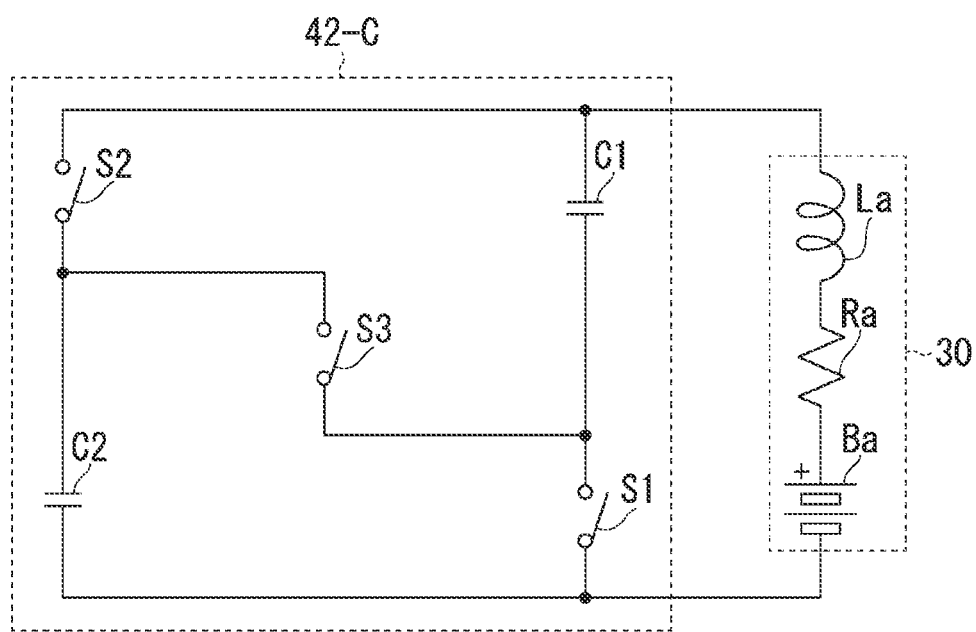
FIG. 4 is a diagram showing an example of a configuration of an AC generation circuit of a comparative example.

Here, an AC generation circuit (hereinafter referred to as an "AC generation circuit 42-C") of a comparative example in which the inductor L3 is not provided will be first described to show the effects of the inductor L3 provided in the AC generation circuit 42-1. FIG. 4 is a diagram showing an example of a configuration of the AC generation circuit 42-C of a comparative example. The AC generation circuit 42-C has a configuration in which the inductor L3 is omitted from the AC generation circuit 42-1. A connection of a capacitor C1, a capacitor C2, a switch S1, a switch S2, and a switch S3 in the AC generation circuit 42-C is equivalent to that in the AC generation circuit 42-1.

Figure 5:
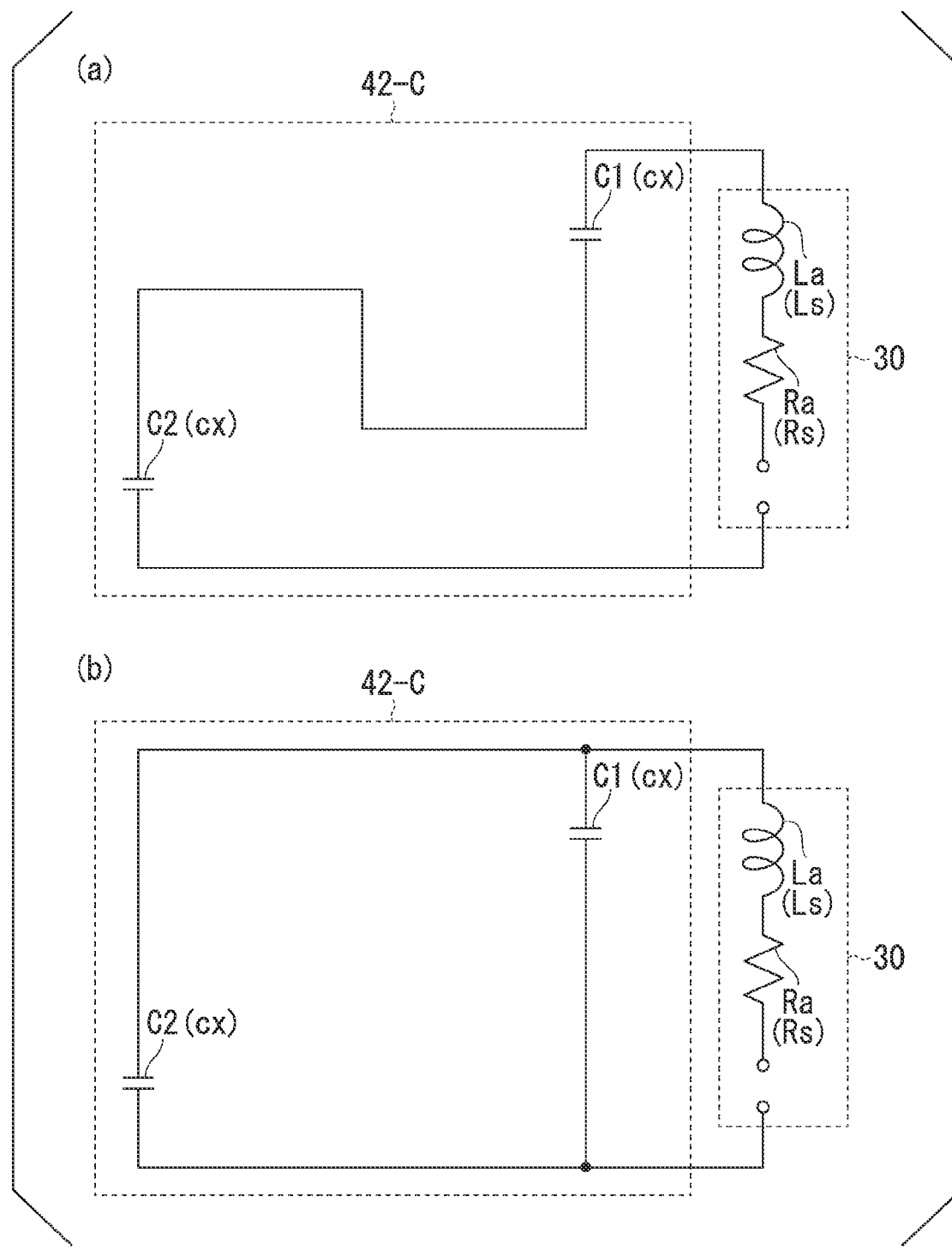
FIG. 5 is an example of a circuit equivalent to the AC generation circuit of the comparative example.

FIG. 5 is an example of a circuit equivalent to the AC generation circuit 42-C of the comparative example. An equivalent circuit when the capacitor C1 and the capacitor C2 are connected to the battery 30 in series in the AC generation circuit 42-C is shown in (a) of FIG. 5 and an equivalent circuit when the capacitor C1 and the capacitor C2 are connected to the battery 30 in parallel in the AC generation circuit 42-C is shown in (b) of FIG. 5. Even in FIG. 5, as in the circuit equivalent to the AC generation circuit 42-1 shown in FIG. 3, an inductance component of inductance La provided in the battery 30 is denoted by "Ls," a resistance component of resistance Ra is denoted by "Rs," and capacitance of the capacitor C1 and the capacitor C2 is denoted by "Cx."

First, the frequency of an AC current generated by the AC generation circuit 42-C will be described with reference to FIG. 5. In the AC generation circuit 42-C, impedance Z when the capacitor C1 and the capacitor C2 are connected in series as shown in (a) of FIG. 5 can be obtained by the following Eq. (1).

$$Z = ZLs + 2ZCx + Rs = j\omega Ls + \frac{2}{j\omega Cx} + Rs = j\left(\omega Ls - \frac{2}{\omega Cx}\right) + Rs \quad (1)$$

A resonance frequency ωs when the capacitor C1 and the capacitor C2 are connected in series in the AC generation circuit 42-C can be obtained by the following Eq. (2).

$$\omega s = \sqrt{2} \cdot \frac{1}{\sqrt{Cx \cdot Ls}} \quad (2)$$

On the other hand, in the AC generation circuit 42-C, impedance Z when the capacitor C1 and the capacitor C2 are connected in parallel as shown in (b) of FIG. 5 can be obtained by the following Eq. (3).

$$Z = ZLs + \frac{ZCx}{2} + Rs = j\omega Ls + \frac{1}{2j\omega Cx} + Rs = \frac{1 - 2\omega^2 LsCx}{2j\omega Cx} + Rs \quad (3)$$

A resonance frequency ωp when the capacitor C1 and the capacitor C2 are connected in parallel in the AC generation circuit 42-C can be obtained by the following Eq. (4).

$$\omega p = \frac{1}{\sqrt{2}} \cdot \frac{1}{\sqrt{Cx \cdot Ls}} \quad (4)$$

Here, in the AC generation circuit 42-C, when the resonance frequency ωs when the capacitor C1 and the capacitor C2 are connected in series is compared with the resonance frequency ωp when the capacitor C1 and the capacitor C2 are connected in parallel, a ratio represented by the following Eq. (5) is obtained.

$$\omega s : \omega p = 2 : 1 \quad (5)$$

That is, in the AC generation circuit 42-C, a resonance frequency differs according to a total capacitance difference between a case where the capacitor C1 and the capacitor C2 are connected in series and a case where the capacitor C1 and the capacitor C2 are connected in parallel. More specifically, a resonance frequency when the capacitor C1 and the capacitor C2 are connected in series becomes twice a resonance frequency when the capacitor C1 and the capacitor C2 are connected in parallel. Thus, in the AC generation circuit 42-C, the current waveform of the generated AC current does not become a sinusoidal wave, but becomes an asymmetric current waveform when the current value is positive and when the current value is negative. Thus, in the AC generation circuit 42-C, a large number of harmonic components are included in the generated AC current and a large amount of noise is radiated when the temperature of the battery 30 is raised.

In order to generate the AC current having a maximum amplitude in the AC generation circuit 42-C, the controller 44 is required to output a control signal for switching a connection of the capacitor C1 and the capacitor C2 to the battery 30 to the series connection or the parallel connection at a ratio between series connection="1" and parallel connection="2," i.e., a duty ratio of 1:2. In other words, when the controller 44 outputs a control signal having a duty ratio of 50% to each switch, the controller 44 cannot generate an AC current having the maximum amplitude.

Operation of Temperature Raising Device in Comparative Example

Figure 6:
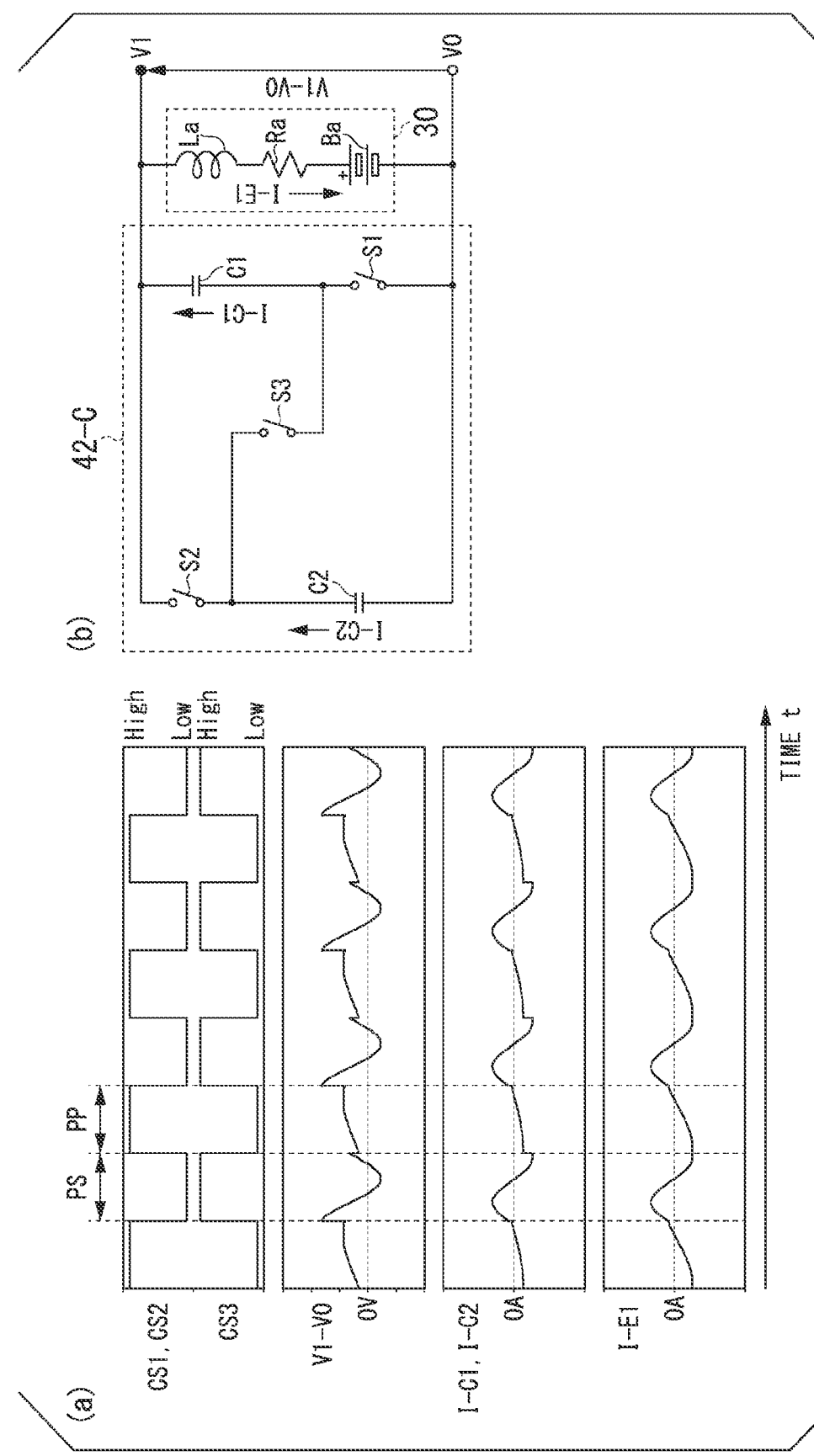
FIG. 6 is a diagram showing an example of an operation waveform of the AC generation circuit of the comparative example.

FIG. 6 is a diagram showing an example of an operation waveform (a simulation waveform) of the AC generation circuit 42-C of the comparative example. An example of control signals output to the switches by the controller 44 and changes in the AC current and the output voltage within the AC generation circuit 42-C is shown in (a) of FIG. 6 and the AC current flowing into the AC generation circuit 42-C is shown in (b) of FIG. 6.

More specifically, the control signal CS1, the control signal CS2, and the control signal CS3 output to the switches by the controller 44 for allowing the AC generation circuit 42-C to generate the AC current are shown in (a) of FIG. 6. In (a) of FIG. 6, it is assumed that the corresponding switch is in the conductive state by setting the control signal CS1, the control signal CS2, and the control signal CS3 at a "High" level and the corresponding switch is in the non-conductive state by setting the control signal CS1, the control signal CS2, and the control signal CS3 at a "Low" level. An operation waveform shown in (a) of FIG. 6 is an example where the controller 44 performs a control process by outputting a control signal whose duty ratio is 50% to each switch such that the AC generation circuit 42-C is allowed to generate an AC current of a sinusoidal wave. Although the controller 44 may provide a dead time for setting all the switches in the non-conductive state between a period in which the switch is set in the conductive state and a period in which the switch is set in the non-conductive state as described above, a case where the controller 44 controls each switch without providing the dead time is shown in (a) of FIG. 6.

In (a) of FIG. 6, an example of changes in a voltage V1-V0 between both electrodes of the battery 30 (including the inductance La), a current I-C1 flowing through the capacitor C1, and a current I-C2 flowing through the capacitor C2, and a current I-E1 flowing through the battery 30 (including the inductance La) that are changed when the controller 44 controls the control signal CS1, the control signal CS2, and the control signal CS3 is shown. In (b) of FIG. 6, an example of a measurement position of the voltage V1-V0 and a direction in which each of the current I-C1, the current I-C2, and the current I-E1 flows is shown.

As shown in (a) of FIG. 6, the controller 44 allows the current I-C1 and the current I-C2 to flow from a positive region to a negative region and also allows the current I-E1 to flow from the positive region to the negative region in a series connection period PS in which the control signal CS1 and the control signal CS2 are set at the "Low" level and the control signal CS3 is set at the "High" level. Thereby, the voltage V1-V0 of the AC generation circuit 42-C decreases from a positive peak voltage to a negative peak voltage and then increases. On the other hand, the controller 44 allows the current I-C1 and the current I-C2 to flow from the negative region to the positive region and also allows the current I-E1 to flow from the negative region to the positive region in a parallel connection period PP in which the control signal CS1 and the control signal CS2 are set at the "High" level and the control signal CS3 is set at the "Low" level. Thereby, the voltage V1-V0 of the AC generation circuit 42-C increases toward the positive peak voltage following the series connection period PS.

In this way, the AC generation circuit 42-C can generate an AC current when the controller 44 outputs a control signal to each switch and switches the connection of the capacitor C1 and the capacitor C2 to the battery 30 to the series connection or the parallel connection. However, as can be seen from the waveforms of the current I-E1 and the voltage V1-V0 in each of the series connection period PS and the parallel connection period PP shown in (a) of FIG. 6, the amplitude of the current waveform of the AC current generated by the AC generation circuit 42-C becomes small. Thus, as described above, the controller 44 is required to output the control signal with a duty ratio of 1:2 such that the AC current having the maximum amplitude is generated in the AC generation circuit 42-C.

Figure 7:
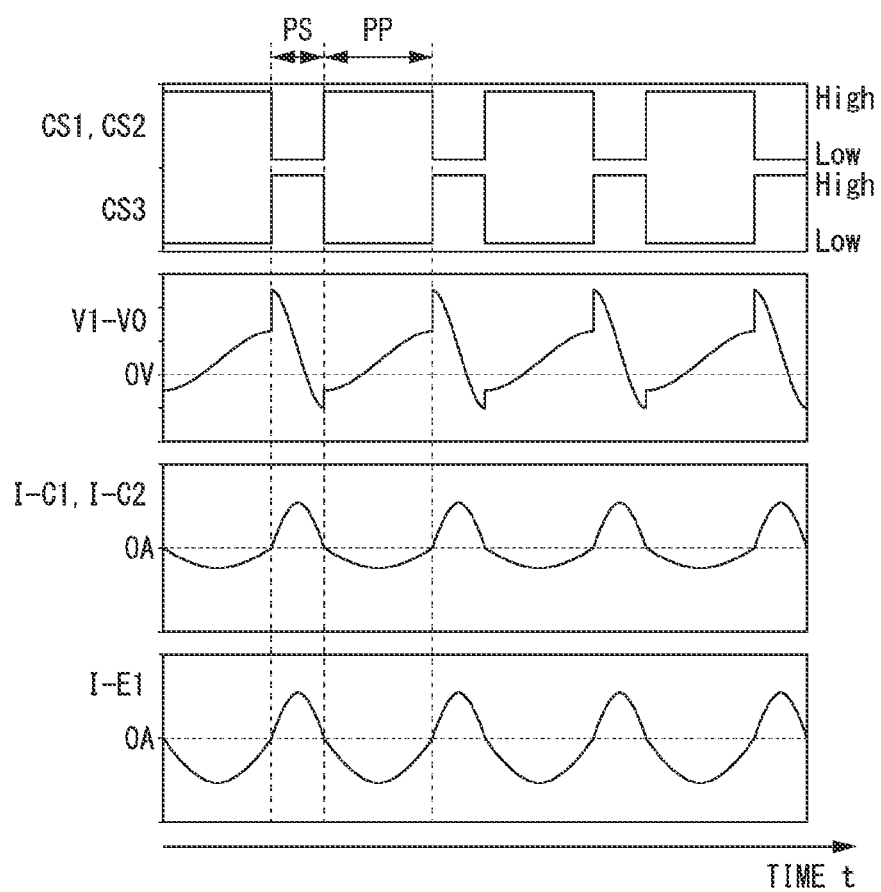
FIG. 7 is a diagram showing another example of the operation waveform of the AC generation circuit of the comparative example.

Here, an operation of a case where the controller 44 allows the AC generation circuit 42-C to generate an AC current having a maximum amplitude by outputting a control signal having a duty ratio of 1:2 to each switch such that a difference in the current waveform of the AC current according to the duty ratio of the control signal is shown will be described. FIG. 7 is a diagram showing another example of an operation waveform (a simulation waveform) of the AC generation circuit 42-C of the comparative example. Even in FIG. 7, control signals and a voltage and a current changed with the control signals are shown as in the example of the operation waveform of the AC generation circuit 42-C in the control signal of the duty ratio of 50% shown in (a)

of FIG. 6. That is, in FIG. 7, an example of control signals output by the controller 44 and changes in a voltage V1-V0 between both electrodes of the battery 30 (including the inductance La) and a current I-C1, a current I-C2, and a current I-E1 flowing through the components, which change with the control signals, is shown. As in the example of the operation waveform of the AC generation circuit 42-C shown in FIG. 6, the operation waveform shown in FIG. 7 is also an example of a case where the controller 44 controls each switch without providing a dead time. Even in the example shown in FIG. 7, an example of a measurement position of the voltage V1-V0 and a direction in which each of the current I-C1, the current I-C2, and the current I-E1 flows is similar to an example shown in (b) of FIG. 6.

As shown in FIG. 7, the current I-C1 and the current I-C2 flow in the positive region and the current I-E1 also flows in the positive region in the series connection period PS shortened by the controller 44 outputting the control signal at the duty ratio of 1:2. Thereby, the voltage V1-V0 of the AC generation circuit 42-C drops from the positive peak voltage to the negative peak voltage. On the other hand, in the parallel connection period PP which is lengthened by the controller 44 outputting the control signal at the duty ratio of 1:2, the current I-C1 and the current I-C2 flow in the negative region, such that the current I-E1 also flows in the negative region. Thereby, the voltage V1-V0 of the AC generation circuit 42-C rises from the negative peak voltage to the positive peak voltage.

As described above, in the AC generation circuit 42-C, the controller 44 outputs a control signal to each switch at a duty ratio of 1:2, such that it is possible to generate an AC current having a larger amplitude (a maximum amplitude), as can be seen by comparing the waveforms of currents I-E1 and voltages V1-V0 of the series connection period PS and the parallel connection period PP in each of (a) of FIG. 6 and FIG. 7. However, when the controller 44 switches the connection of the capacitor C1 and the capacitor C2 to the battery 30 to a series connection or a parallel connection at a duty ratio of 1:2, the current waveform of the AC current generated by the AC generation circuit 42-C is not a sinusoidal wave and the amplitude thereof is also different between positive and negative regions of the AC current, as can be seen from the waveforms of the currents I-E1 and the voltages V1-V0 of the series connection period PS and the parallel connection period PP in FIG. 7.

The frequency of the AC current generated by the AC generation circuit 42-1 will be described with reference to FIG. 3 again. First, a resonance frequency when the capacitor C1 and the capacitor C2 are connected in series shown in (a) of FIG. 3 is taken into account. When the capacitor C1 and the capacitor C2 are connected in series in the AC generation circuit 42-1, Ly=0 because the inductor L3 is short-circuited by the switch S3 as described above. Accordingly, even in the AC generation circuit 42-1, the impedance Z when the capacitor C1 and the capacitor C2 are connected in series can be obtained as shown in the above Eq. (1) as in the AC generation circuit 42-C and the resonance frequency cos can be obtained as shown in the above Eq. (2).

Next, the resonance frequency when the capacitor C1 and the capacitor C2 are connected in parallel shown in (b) of FIG. 3 is taken into account. When the capacitor C1 and the capacitor C2 are connected in parallel in the AC generation circuit 42-1, the inductor L3 is arranged between the capacitor C1 and the capacitor C2 as described above. Thus, in the AC generation circuit 42-1, the impedance Z when the capacitor C1 and the capacitor C2 are connected in parallel can be obtained as shown in the following Eq. (6), unlike the AC generation circuit 42-C.

$$Z = ZLs + \frac{1}{\frac{2}{ZCx} + \frac{1}{ZLy}} + Rs = ZLs + \frac{ZCx \cdot ZLy}{ZCx + 2ZLy} + Rs \quad (6)$$

$$= j\omega Ls + \frac{\frac{1}{j\omega Cx} \cdot j\omega Ly}{\frac{1}{j\omega Cx} + 2j\omega Ly} + Rs = j\omega Ls + \frac{\frac{Ly}{Cx}}{\frac{1}{j\omega Cx} + 2j\omega Ly} + Rs$$

$$= \frac{j\omega Ls\left(\frac{1}{j\omega Cx} + 2j\omega Ly\right) + \frac{Ly}{Cx}}{\frac{1}{j\omega Cx} + 2j\omega Ly} + Rs = \frac{Ls\left(\frac{1}{Cx} - 2\omega^2 Ly\right) + \frac{Ly}{Cx}}{\frac{1}{j\omega Cx} + 2j\omega Ly} + Rs$$

$$= \frac{\frac{Ls + Ly}{Cx} - 2\omega^2 LsLy}{\frac{1}{j\omega Cx} + 2j\omega Ly} + Rs$$

The resonance frequency top when the capacitor C1 and the capacitor C2 are connected in parallel in the AC generation circuit 42-1 can be obtained as shown in the following Eq. (7).

$$\omega p = \frac{1}{\sqrt{2}} \cdot \sqrt{\frac{Ls + Ly}{Cx \cdot Ls \cdot Ly}} \quad (7)$$

From this, in the AC generation circuit 42-1, it is only necessary to establish the following Eq. (9) because the resonance frequency cos when the capacitor C1 and the capacitor C2 are connected in series is equal to the resonance frequency top when the capacitor C1 and the capacitor C2 are connected in parallel (the following Eq. (8) is given).

$$\omega s = \omega p \quad (8)$$

$$\frac{2}{Cx \cdot Ls} = \frac{Ls + Ly}{2 \cdot Cx \cdot Ls \cdot Ly} \quad (9)$$

From this, it is only necessary to provide the inductance Ly of the inductor L3 in the AC generation circuit 42-1 such that the following Eq. (10) is established.

$$Ly = \frac{Ls}{3} \quad (10)$$

That is, if the inductance Ly of the inductor L3 is set to one-third of the inductance component Ls of the inductance La provided in the battery 30, the resonance frequency cos when the capacitor C1 and the capacitor C2 are connected in series can be made equal to the resonance frequency top when the capacitor C1 and the capacitor C2 are connected in parallel in the AC generation circuit 42-1.

Figure 8:
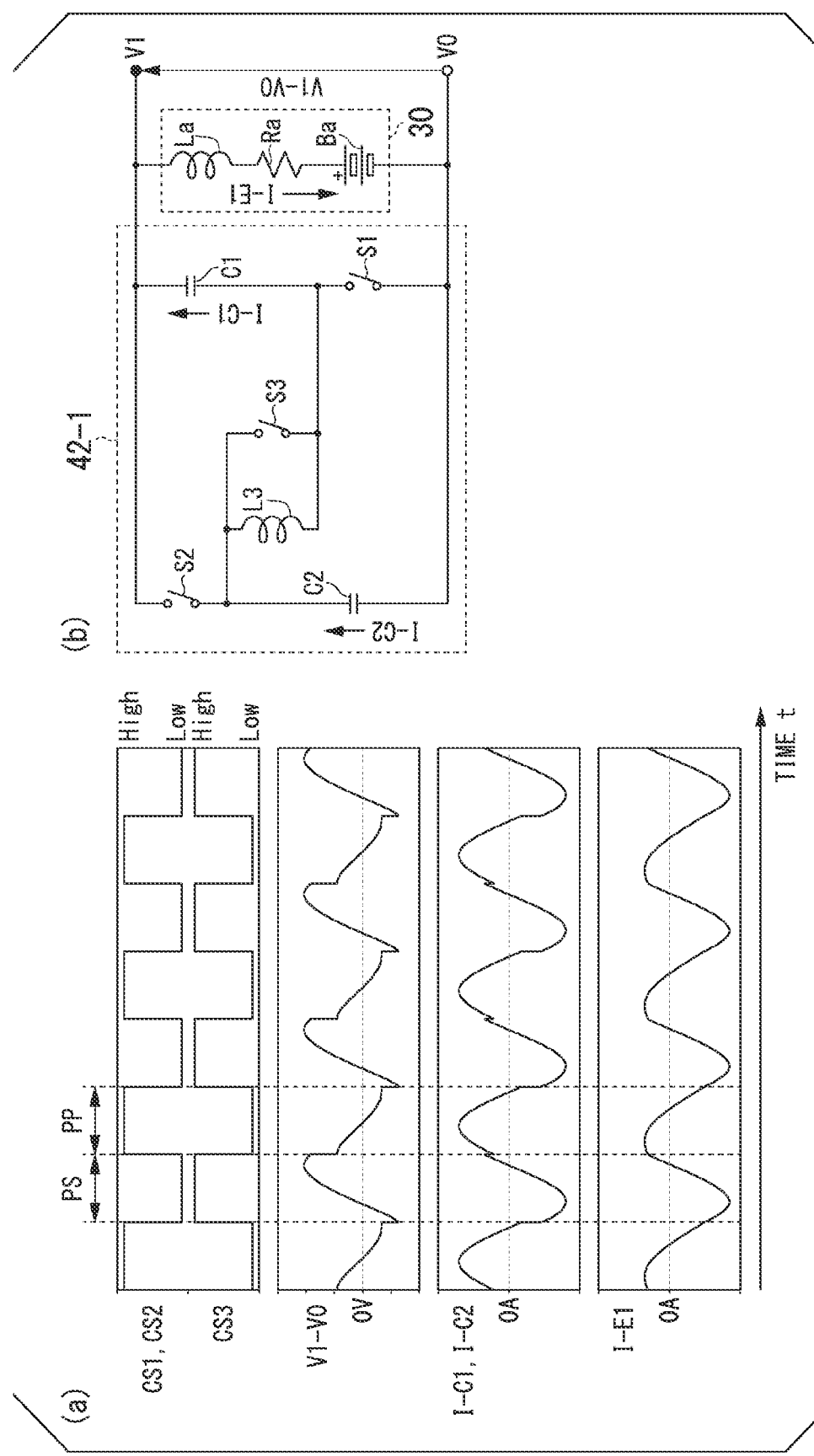
FIG. 8 is a diagram showing an example of an operation waveform of the AC generation circuit of the first embodiment.

FIG. 8 is a diagram showing an example of an operation waveform (a simulation waveform) of the AC generation circuit 42-1 of the first embodiment. In FIG. 8, control signals and a voltage and a current that change with the control signals are also shown as in the case of the operation waveform of the AC generation circuit 42-C of the comparative example shown in FIG. 6 or 7. That is, an example of changes in control signals output by the controller 44 and changes in a voltage V1-V0 between both electrodes of the battery 30 (including the inductance La) and a current I-C1, a current I-C2, and a current I-E1 flowing through the components, which change with the control signals, is shown in (a) of FIG. 8 and an example of a measurement position of the voltage V1-V0 and a direction in which each of the current I-C1, the current I-C2, and the current I-E1 flows is shown in (b) of FIG. 8.

The operation waveform shown in (a) of FIG. 8 is an example of a case where the controller 44 outputs a control signal having a duty ratio of 50% to each switch such that the AC generation circuit 42-1 is allowed to generate an AC current of a sinusoidal wave. As in the example of the operation waveform of the AC generation circuit 42-C shown in FIG. 6 or 7, the operation waveform shown in (a) of FIG. 8 is also an example of a case where the controller 44 controls each switch without providing a dead time.

As shown in (a) of FIG. 8, in the AC generation circuit 42-1, the current I-E1 also flows mainly in the negative region when the current I-C1 and the current I-C2 flow mainly in the negative region in the series connection period PS in which the controller 44 sets the control signal CS1 and the control signal CS2 at the "Low" level and sets the control signal CS3 at the "High" level. Thereby, the voltage V1-V0 of the AC generation circuit 42-1 rises from the negative peak voltage to the positive peak voltage. On the other hand, in the AC generation circuit 42-1, the current I-E1 also flows mainly in the positive region when the current I-C1 and the current I-C2 flow mainly in the positive region in the parallel connection period PP in which the controller 44 sets the control signal CS1 and the control signal CS2 at the "High" level and sets the control signal CS3 at the "Low" level. Thereby, the voltage V1-V0 of the AC generation circuit 42-1 drops from the positive peak voltage to the negative peak voltage.

In this way, the controller 44 can allow an AC current to be generated as in the AC generation circuit 42-C even in the AC generation circuit 42-1, when the controller 44 outputs a control signal to each switch and switches the connection of the capacitor C1 and the capacitor C2 to the battery 30 to the series connection or the parallel connection. Moreover, as can be seen from the waveforms of the current I-E1 and the voltage V1-V0 in each of the series connection period PS and the parallel connection period PP shown in (a) of FIG. 8, the current waveform of the AC current generated by the AC generation circuit 42-1 is closer to a sinusoidal wave than the current waveform of the AC current generated by the AC generation circuit 42-C shown in (a) of FIG. 6 or FIG. 7 and the amplitude thereof also has a smaller absolute value difference between the positive region and the negative region of the AC current.

In this way, in the AC generation circuit 42-1, when the capacitor C1 and the capacitor C2 are connected in parallel, the inductor L3 is configured to be arranged between the capacitor C1 and the capacitor C2, such that the duty ratio of the control signal output by the controller 44 can be set to 50% and the current waveform of the generated AC current can be made closer to a sinusoidal wave. That is, the AC generation circuit 42-1 can generate an AC current having a symmetric current waveform when the current value is positive and when the current value is negative. Thereby, in the AC generation circuit 42-1, it is possible to facilitate the control of each switch in the controller 44 and raise the temperature of the battery 30 more efficiently according to the generated AC current having a current waveform close to the sinusoidal wave. In other words, in the AC generation circuit 42-1, it is possible to generate an AC current with a reduced harmonic component and it is possible to reduce radiated noise when raising the temperature of the battery 30.

From this, the AC generation circuit 42-1 is more easily applied because it has a configuration in which the temperature is raised, and the change (a so-called ripple of a voltage waveform) in the entire voltage obtained by a combination of a plurality of batteries 30 is reduced, by applying an AC current to each battery 30 (allowing an AC current to flow through each battery 30), for example, when the battery 30 mounted in the vehicle 1 has a configuration in which a plurality of (for example, two) batteries 30 are combined. More specifically, the AC generation circuit 42-1 is more easily applied because it has a configuration in which, when the battery 30 mounted in the vehicle 1 has a configuration in which two batteries 30 are combined, one AC generation circuit 42-1 is connected to each battery 30, the controller 44 performs a control process in which a phase of the AC current generated by each AC generation circuit 42-1 is shifted (shifted by 180°), and therefore the change in the entire voltage output by a combination of two batteries 30 is reduced.

[Another Operation of Temperature Raising Device]

Figure 9:
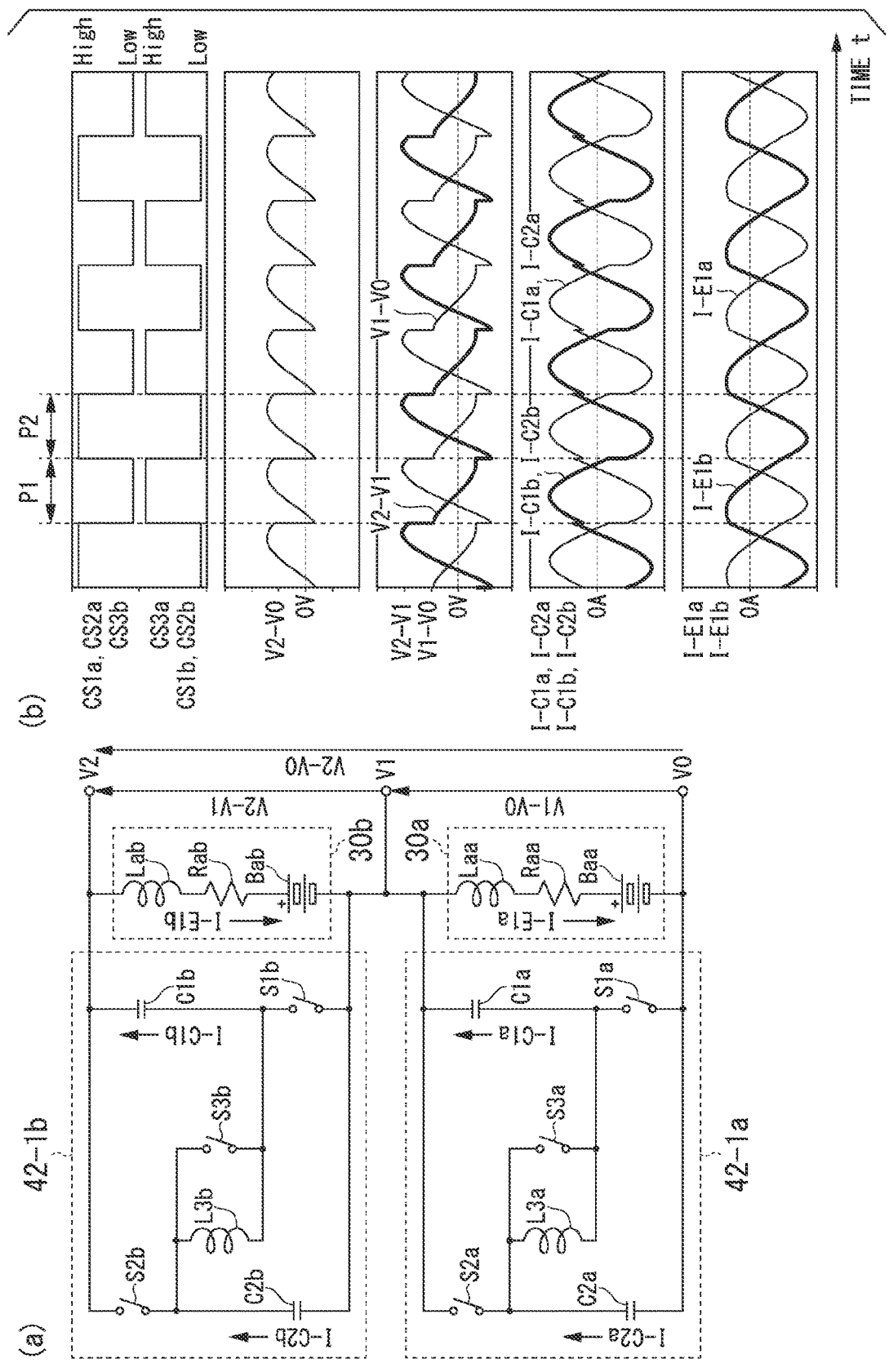
FIG. 9 is a diagram showing another example of the operation waveform of the AC generation circuit of the first embodiment.

FIG. 9 is a diagram showing another example of an operation waveform (a simulation waveform) of the AC generation circuit 42-1 of the first embodiment. FIG. 9 is an example of a configuration in which the battery 30 mounted in the vehicle 1 is a combination of two batteries 30 (a battery 30a and a battery 30b). In (a) of FIG. 9, a connection of the AC generation circuit 42-1 (an AC generation circuit 42-1a and an AC generation circuit 42-1b) corresponding to each battery 30 and an AC current flowing into each AC generation circuit 42-1 are shown. In (b) of FIG. 9, an example of control signals output to the switches by the controller 44 and an AC current and an output voltage within each AC generation circuit 42-1 is shown. In FIG. 9, "a" added to the end of each reference sign indicates that it corresponds to the AC generation circuit 42-1a, and "b" added to the end of each reference sign indicates that it corresponds to the AC generation circuit 42-1b.

As shown in (a) of FIG. 9, in the case of a configuration in which two batteries 30 are combined, the AC generation circuit 42-1a is connected to one battery 30a and the AC generation circuit 42-1b is connected to the other battery 30b. The controller 44 outputs a control signal to the switch provided in each AC generation circuit 42-1 such that the phase of the AC current generated by each AC generation circuit 42-1 is shifted by 180°. In (b) of FIG. 9, a case in which the controller 44 outputs a control signal having a duty ratio of 50% to each AC generation circuit 42-1 such that each AC generation circuit 42-1 is allowed to generate an AC current of a sinusoidal wave is shown. The control signal shown in (b) of FIG. 9 is also an example of a control signal when the controller 44 controls each switch without providing a dead time.

In (a) of FIG. 9, an example of a voltage measurement position and a current flow direction that change in each AC generation circuit 42-1 when the controller 44 controls each switch using a control signal is shown. More specifically, a voltage V1-V0 between both electrodes of the battery 30a (including inductance Laa), a current I-C1a flowing through a capacitor C1a, a current I-C2a flowing through a capacitor C2a and a current I-E1a flowing through the battery 30a (including the inductance Laa) are shown as an example of the voltage and current corresponding to the AC generation circuit 42-1a. Further, a voltage V2-V1 between both electrodes of the battery 30b (including inductance Lab), a current I-C1b flowing through a capacitor C1b, a current I-C2b flowing through a capacitor C2b and a current I-E1b flowing through the battery 30b (including the inductance Lab) are shown as an example of the voltage and current corresponding to the AC generation circuit 42-1b. In (a) of FIG. 9, a voltage V2-V0 between both ends of one end (V0) on the negative electrode side of the battery 30a in the AC generation circuit 42-1a and one end (V2) on the positive electrode side of the battery 30b in the AC generation circuit 42-1b is shown as the entire voltage of the combination of the battery 30a and the battery 30b. In (b) of FIG. 9, an example of changes in the current and voltage between the AC generation circuit 42-1a and the AC generation circuit 42-1b is shown.

As shown in (b) of FIG. 9, during the period P1, the controller 44 sets the control signal CS1a and the control signal CS2a of the AC generation circuit 42-1a at the "Low" level and sets the control signal CS3a at the "High" level. Thereby, in the AC generation circuit 42-1a, the capacitor C1a and the capacitor C2a are connected in series via the inductor L3a and the current I-C1a and the current I-C2a mainly flow in the negative region as in the series connection period PS shown in (b) of FIG. 8, such that the current I-E1a also flows mainly in the negative region. Thereby, the voltage V1-V0 of the AC generation circuit 42-1a rises from the negative peak voltage to the positive peak voltage, as in the series connection period PS shown in (b) of FIG. 8. On the other hand, during the period P1, the controller 44 sets the control signal CS1b and the control signal CS2b of the AC generation circuit 42-1b at the "High" level and sets the control signal CS3b at the "Low" level. Thereby, in the AC generation circuit 42-1b, the capacitor C1b and the capacitor C2b are connected in parallel and the current I-C1b and the current I-C2b flow mainly in the positive region as in the parallel connection period PP shown in (b) of FIG. 8, such that the current I-E1b also flows mainly in the positive region. Thereby, the voltage V2-V1 of the AC generation circuit 42-1b drops from the positive peak voltage to the negative peak voltage.

Subsequently, as shown in (b) of FIG. 9, during the period P2, the controller 44 sets the control signal CS1a and the control signal CS2a of the AC generation circuit 42-1a at the "High" level and sets the control signal CS3a at the "Low" level. Thereby, in the AC generation circuit 42-1a, the capacitor C1a and the capacitor C2a are connected in parallel and the current I-C1a and the current I-C2a mainly flow in the positive region as in the parallel connection period PP shown in (b) of FIG. 8, such that the current I-E1a also flows mainly in the positive region. Thereby, the voltage V1-V0 of the AC generation circuit 42-1a drops from the positive peak voltage to the negative peak voltage. On the other hand, during the period P2, the controller 44 sets the control signal CS1b and the control signal CS2b of the AC generation circuit 42-1b at the "Low" level and sets the control signal CS3b at the "High" level. Thereby, in the AC generation circuit 42-1b, the capacitor C1b and the capacitor C2b are connected in series via the inductor L3b and the current I-C1b and the current I-C2b flow mainly in the negative region as in the series connection period PS shown in (b) of FIG. 8, such that the current I-E1b also flows mainly in the negative region. Thereby, the voltage V2-V1 of the AC generation circuit 42-1b rises from the negative peak voltage to the positive peak voltage, as in the series connection period PS shown in (b) of FIG. 8.

As described above, when the battery 30 mounted in the vehicle 1 has a configuration in which two batteries 30 (here, the battery 30a and the battery 30b) are combined, the controller 44 controls the AC generation circuit 42-1 corresponding to each battery 30 by outputting a control signal such that the operation is reversed. Thereby, as shown in (b) of FIG. 9, it is possible to reduce the change in the entire voltage V2-V0 when the two batteries 30 are combined. This is because the current waveform of the AC current generated by each AC generation circuit 42-1 becomes a current waveform close to a sinusoidal wave that is symmetric between the positive current value and the negative current value.

Another Operation of Temperature Raising Device in Comparative Example

Even in the AC generation circuit 42-C of the comparative example shown in FIG. 4, it is possible to apply the battery 30 mounted in the vehicle 1 to a configuration in which two batteries 30 are combined. However, because the current waveform of the alternating current generated by the AC generation circuit 42-C is an asymmetric current waveform between the positive current value and the negative current value, the effect of reducing the change in the entire voltage when the two batteries 30 are combined is reduced.

Figure 10:
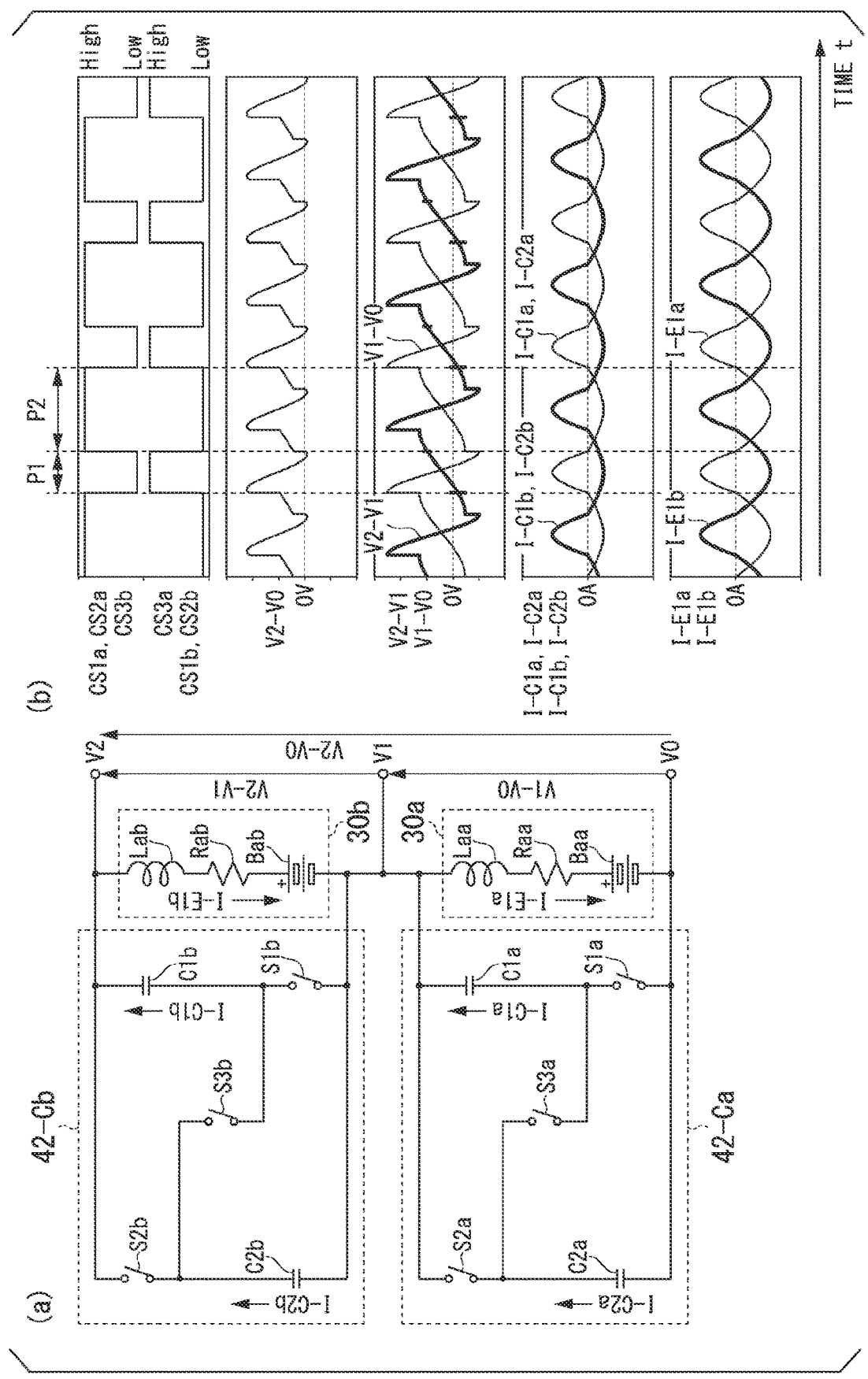
FIG. 10 is a diagram showing another example of the operation waveform of the AC generation circuit of the comparative example.

Here, an example of a case where the AC generation circuit 42-C is applied to a configuration in which two batteries 30 are combined is shown for the comparison with the AC generation circuit 42-1. FIG. 10 is a diagram showing another example of the operation waveform of the AC generation circuit 42-C of the comparative example. FIG. 10 shows an example in which the AC generation circuit 42-C is connected to each battery 30 when the battery 30 mounted in the vehicle 1 has a configuration in which two batteries 30 (the battery 30a and the battery 30b) are combined. In this case, the operation of the AC generation circuit 42-C and the control of the AC generation circuit 42-C in the controller 44 are conceivable like the operation of the AC generation circuit 42-1 shown in FIG. 9 and the control of the AC generation circuit 42-1 in the controller 44 with reference to the operation of the AC generation circuit 42-C shown in FIG. 6 or 7 and the control of the AC generation circuit 42-C in the controller 44. Accordingly, a detailed description related to the operation of the AC generation circuit 42-C shown in FIG. 10 and the control of the AC generation circuit 42-C in the controller 44 will be omitted.

When the voltage waveform of the voltage V2-V0 shown in (b) of FIG. 9 is compared with the voltage waveform of the voltage V2-V0 shown in (b) of FIG. 10, it can be seen that the effect of reducing the change in the voltage V2-V0 is significant in the case where the AC generation circuit 42-1 is applied to the configuration in which the two batteries 30 are combined as compared with the case where the AC generation circuit 42-C is applied to the configuration in which the two batteries 30 are combined.

In this way, in the temperature raising device 40 of the first embodiment, the inductor L3 having the inductance Ly having a value, which is one-third of the inductance component Ls of the inductance La provided in the battery 30, is connected in parallel between the first terminal and the second terminal of the switch S3 in the AC generation circuit 42-1. In the temperature raising device 40 of the first embodiment, when an AC current based on electric power stored in the battery 30 is generated according to the resonance operation of the inductance La provided in the battery 30 and at least the capacitor C1, the inductor L3 is arranged between the capacitor C1 and the capacitor C2 in the case where the capacitor C1 and the capacitor C2 are connected in parallel in the AC generation circuit 42-1. Thereby, in the temperature raising device 40 of the first embodiment, the current waveform of the generated AC current is made closer to a sinusoidal wave, the duty ratio of the control signal output by the controller 44 is made closer to 50%, and the controller 44 can easily control each switch. Thereby, in the temperature raising device 40 of the first embodiment, the temperature of the battery 30 can be raised more efficiently due to the AC current having a current waveform close to the sinusoidal wave generated by the AC generation circuit 42-1.

Further, in the temperature raising device 40 of the first embodiment, for example, when the battery 30 mounted in the vehicle 1 has a configuration in which two batteries 30 are combined, the controller 44 can reduce the change in the entire voltage output by a combination of the two batteries 30 by performing a control process in which a phase of the AC current generated by each AC generation circuit 42-1 is shifted (shifted by 180°).

Second Embodiment

[Configuration of AC Generation Circuit Provided in Temperature Raising Device]

Figure 11:
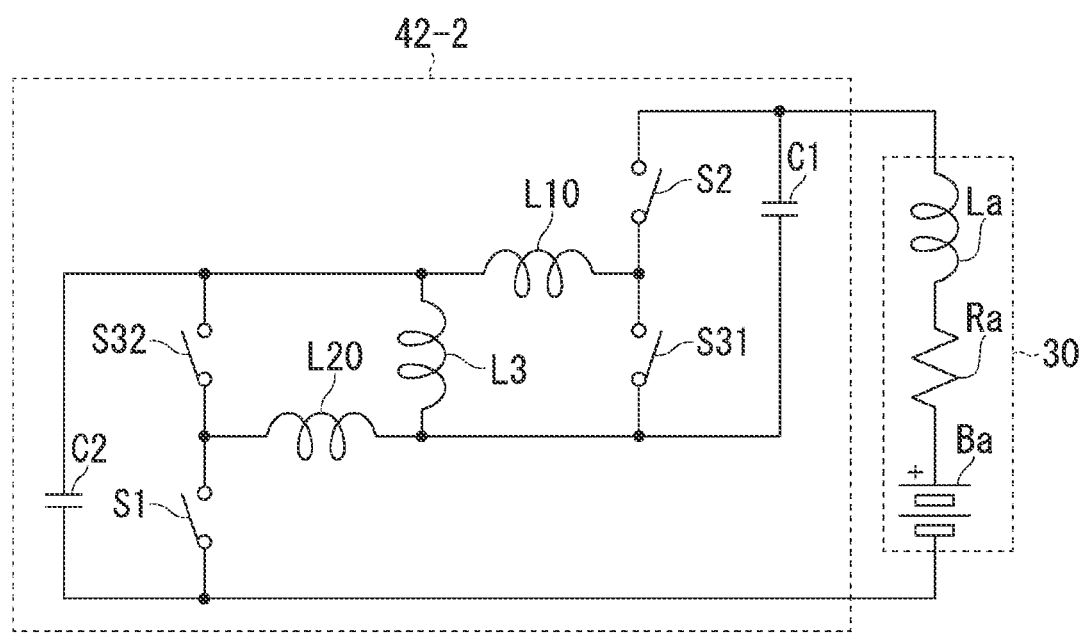
FIG. 11 is a diagram showing an example of a configuration of an AC generation circuit provided in the temperature raising device according to a second embodiment.

FIG. 11 is a diagram showing an example of a configuration of an AC generation circuit 42 (hereinafter referred to as an "AC generation circuit 42-2") provided in the temperature raising device 40 according to a second embodiment. In FIG. 11, a battery 30 related to the AC generation circuit 42-2 is also shown. The AC generation circuit 42-2 includes, for example, a capacitor C1, a capacitor C2, a switch S1, a switch S2, a switch S31, a switch S32, an inductor L3, an inductor L10, and an inductor L20.

The AC generation circuit 42-2 has a configuration in which two switches of the switch S31 and the switch S32 are replaced with the switch S3 provided in the AC generation circuit 42-1 of the first embodiment and the inductor L10 and the inductor L20 are added. The other components provided in the AC generation circuit 42-2, i.e., the capacitor C1, the capacitor C2, the switch S1, the switch S2, and the inductor L3 are equivalent to those of the AC generation circuit 42-1 of the first embodiment. The inductor L10 and the inductor L20 are inductors having the same inductance. Like the switch S3 provided in the AC generation circuit 42-1, each of the switch S31 and the switch S32 is controlled in a conductive state (a closed state) in which a connection between both terminals is established or a non-conductive state (an open state) in which the connection between both terminals is disconnected in accordance with a control signal output by the controller 44. In the following description, the control signal output by the controller 44 to control the switch S31 such that the switch S31 is in the conductive state or the non-conductive state is referred to as a "control signal CS31" and the control signal output by the controller 44 to control the switch S32 such that the switch S32 is in the conductive state or the non-conductive state is referred to as a "control signal CS32." Like the switch S3 provided in the AC generation circuit 42-1, each of the switch S31 and the switch S32 may be a semiconductor switching element such as an N-channel type metal oxide film semiconductor field effect transistor (MOSFET).

Even in the AC generation circuit 42-2, a first end of the capacitor C1 is connected to a positive electrode side of the battery 30 and a first end of the capacitor C2 is connected to a negative electrode side of the battery 30. Further, even in the AC generation circuit 42-2, a first terminal of the switch S2 is connected to the first end of the capacitor C1 and a second terminal of the switch S1 is connected to the first end of the capacitor C2. In the AC generation circuit 42-2, a second terminal of the switch S31, a second end of the inductor L3, and a second end of the inductor L20 are connected to a second end of the capacitor C1, and a first terminal of the switch S32, a first end of the inductor L3, and a first end of the inductor L10 are connected to a second end of the capacitor C2. Further, in the AC generation circuit 42-2, a first end of the inductor L20 is connected between a first terminal of the switch S1 and a second terminal of the switch S32 and a second end of the inductor L10 is connected between a second terminal of the switch S2 and a first terminal of the switch S31.

According to such a configuration, in the AC generation circuit 42-2, the capacitor C1 and the capacitor C2 are connected in parallel or in series between the positive electrode side and the negative electrode side of the battery 30 in accordance with the control from the controller 44. More specifically, the controller 44 allows the capacitor C1 and the capacitor C2 to be connected in parallel between the positive electrode side and the negative electrode side of the battery 30 by outputting a control signal CS1 for setting the conductive state to the switch S1, outputting a control signal CS2 for setting the conductive state to the switch S2, outputting a control signal CS31 for setting the non-conductive state to the switch S31, and outputting a control signal CS32 for setting the non-conductive state to the switch S32. On the other hand, the controller 44 allows the capacitor C1 and the capacitor C2 to be connected in series between the positive electrode side and the negative electrode side of the battery 30 by outputting the control signal CS1 for setting the non-conductive state to the switch S1, outputting the control signal CS2 for setting the non-conductive state to the switch S2, outputting the control signal CS31 for setting the conductive state to the switch S31, and outputting the control signal CS32 for setting the conductive state to the switch S32.

In the AC generation circuit 42-2, the capacitor C1 is an example of a "first capacitor" in the claims and the capacitor C2 is an example of a "second capacitor" in the claims. In the AC generation circuit 42-2, a configuration in which the switch S1 and the switch S2 are combined is an example of a "parallel switch unit" in the claims and a configuration in which the switch S31 and the switch S32 are combined is an example of a "series switch unit" in the claims. In the AC generation circuit 42-2, the switch S1 is an example of a "first switch" in the claims, the switch S2 is an example of a "second switch" in the claims, the switch S31 is an example of a "third switch" in the claims, and switch S32 is an example of a "fourth switch" in the claims. In the AC generation circuit 42-2, the inductor L3 is an example of a "first inductor" in the claims, the inductor L10 is an example of a "second inductor" in the claims, and the inductor L20 is an example of a "third inductor" in the claims. The control signal CS1 output to the switch S1 by the controller 44 and the control signal CS2 output to the switch S2 by the controller 44 are examples of a "first control signal" in the claims and the control signal CS31 output to the switch S31 by the controller 44 and the control signal CS32 output to the switch S32 by the controller 44 are examples of a "second control signal" in the claims. In the AC generation circuit 42-2, a state in which the capacitor C1 and the capacitor C2 are connected in parallel between the positive electrode side and the negative electrode side of the battery 30 is an example of a "first state" in the claims and a state in which the capacitor C1 and the capacitor C2 are connected in series between the positive electrode side and the negative electrode side of the battery 30 is an example of a "second state" in the claims.

[Operation of Temperature Raising Device]

Figure 12:
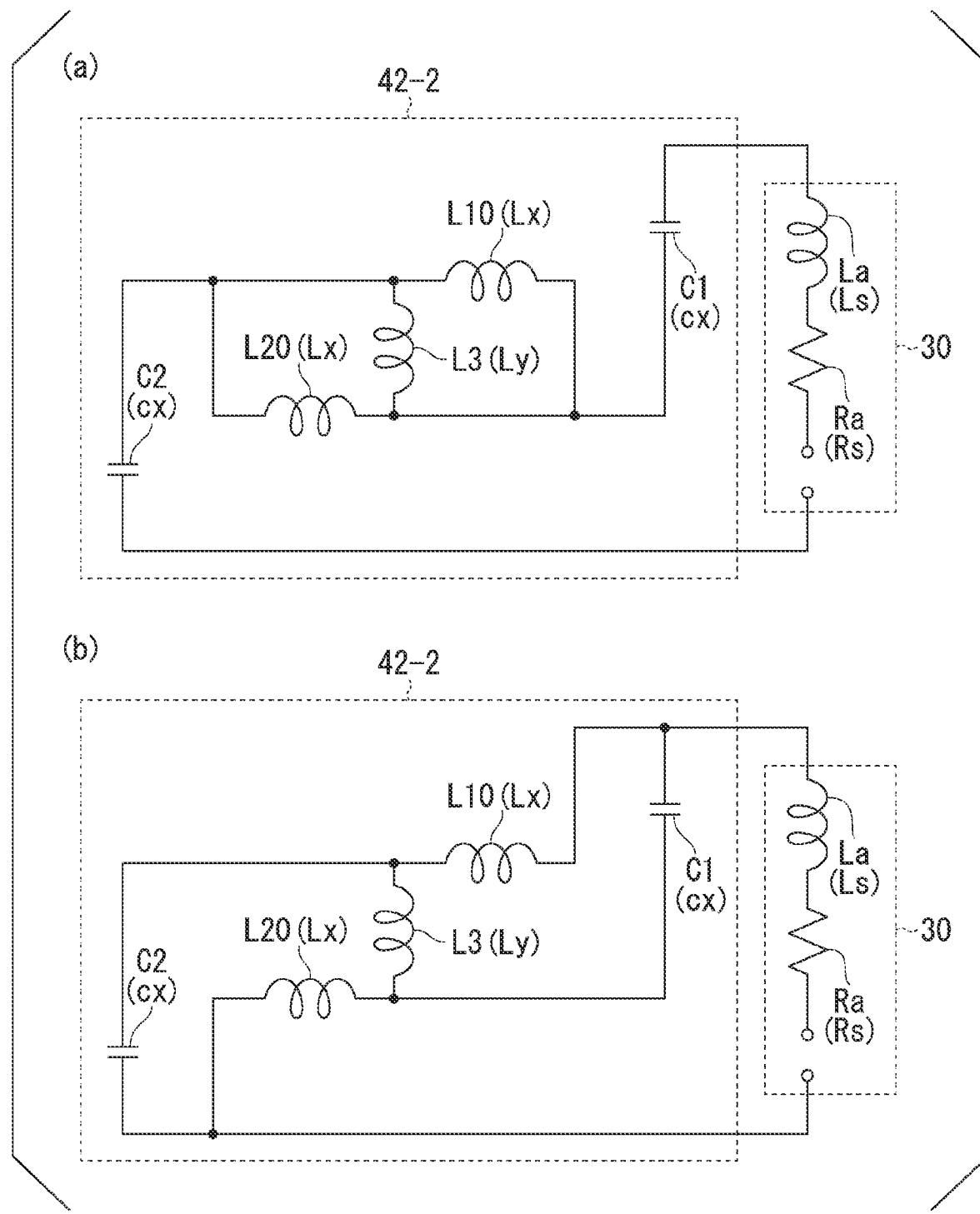
FIG. 12 is an example of a circuit equivalent to the AC generation circuit of the second embodiment.

FIG. 12 is an example of a circuit equivalent to the AC generation circuit 42-2 of the second embodiment. An equivalent circuit when the capacitor C1 and the capacitor C2 are connected in series to the battery 30 is shown in (a) of FIG. 12 and an equivalent circuit when the capacitor C1 and the capacitor C2 are connected to the battery 30 in parallel is shown in (b) of FIG. 12. Even in FIG. 12, an inductance component of the inductance La provided in the battery 30 is denoted by "Ls" and a resistance component of the resistance Ra is denoted by "Rs." The capacitance of the capacitors C1 and C2 is denoted by "Cx," and the inductance of the inductor L3 is denoted by "Ly." Further, the inductance of the inductor L10 and the inductor L20 is denoted by "Lx."

Because the capacitor C1 and the capacitor C2 are capacitors having the same capacitance, the total capacitance is different between a case where the capacitor C1 and the capacitor C2 are connected to the battery 30 in series and a case where the capacitor C1 and the capacitor C2 are connected to the battery 30 in parallel even in the AC generation circuit 42-2 as in the AC generation circuit 42-1 when the capacitor C1 and the capacitor C2 are considered to be one capacitor. Thus, the frequency of a generated AC current is different between the case where the capacitor C1 and the capacitor C2 are connected to the battery 30 in series and the case where the capacitor C1 and the capacitor C2 are connected to the battery 30 in parallel even in the AC generation circuit 42-2 as in the AC generation circuit 42-1. Even in the AC generation circuit 42-2, preferably, a current waveform of the generated AC current is a sinusoidal wave and the duty ratio of each of the control signals output by the controller 44 to the switch S1, the switch S2, the switch S31, and the switch S32 is 50% such that the temperature of the battery 30 is efficiently raised by the temperature raising device 40. Here, the frequency of the AC current generated by the AC generation circuit 42-2 is considered.

First, a resonance frequency when the capacitor C1 and the capacitor C2 are connected in series shown in (a) of FIG. 12 will be described. When the capacitor C1 and the capacitor C2 are connected in series in the AC generation circuit 42-2, a circuit of the inductor L3, the inductor L10, and the inductor L20 is arranged between the capacitor C1 and the capacitor C2. Thus, the impedance Z when the capacitor C1 and the capacitor C2 are connected in series in the AC generation circuit 42-2 can be obtained as shown in the following Eq. (11).

$$Z = ZLs + 2ZCx + \frac{1}{\frac{2}{ZLx} + \frac{1}{ZLy}} + Rs = ZLs + 2ZCx + \frac{ZLx \cdot ZLy}{ZLx + 2ZLy} + Rs \quad (11)$$

$$= \frac{2ZCx(ZLx + 2ZLy) + ZLs(ZLx + 2ZLy) + ZLx \cdot ZLy}{ZLx + 2ZLy} + Rs$$

$$= \frac{\frac{2}{j\omega Cx}(j\omega Lx + 2j\omega Ly) + j\omega Ls(j\omega Lx + 2j\omega Ly) + j\omega Lx \cdot j\omega Ly}{j\omega Lx + 2j\omega Ly} + Rs$$

$$= \frac{\frac{2Lx + 4Ly}{Cx} - \omega^2(Ls \cdot Lx + 2Ls \cdot Ly + Lx \cdot Ly)}{j\omega Lx + 2j\omega Ly} + Rs$$

A resonance frequency cos when the capacitor C1 and the capacitor C2 are connected in series in the AC generation circuit 42-2 is the frequency at which the impedance Z obtained by the above Eq. (11) becomes the minimum and which becomes equal to that of the resistance component Rs. From this, it is only necessary to set the numerator portion of a first term on the right side in the above Eq. (11) to zero for the resonance frequency cos. That is, it is only necessary to set the resonance frequency cos such that the following Eq. (12) is established.

$$\frac{2Lx + 4Ly}{Cx} - \omega s^2 (Ls \cdot Lx + 2Ls \cdot Ly + Lx \cdot Ly) = 0 \quad (12)$$

From the above Eq. (12), the resonance frequency cos can be obtained as in the following Eq. (13).

$$\omega s = \sqrt{\frac{2Lx + 4Ly}{Cx(Ls \cdot Lx + 2Ls \cdot Ly + Lx \cdot Ly)}} \quad (13)$$

Next, the resonance frequency when the capacitor C1 and the capacitor C2 are connected in parallel shown in (a) of FIG. 12 will be described. When the capacitor C1 and the capacitor C2 are connected in parallel in the AC generation circuit 42-2, the inductor L10 is connected in series between the first end of the capacitor C1 and the second end of the capacitor C2, the inductor L20 is connected in series between the second end of the capacitor C1 and the first end of the capacitor C2, and the inductor L3 is connected between the inductor L10 and the inductor L20. Thus, the impedance Z when the capacitor C1 and the capacitor C2 are connected in parallel in the AC generation circuit 42-2 can be obtained as shown in the following Eq. (14).

$$Z = ZLs + \frac{2ZCx \cdot ZLx + ZCx \cdot ZLy + ZLx \cdot ZLy}{ZCx + ZLx + 2ZLy} + Rs \quad (14)$$

$$= \frac{ZLs(ZCx + ZLx + 2ZLy) + 2ZCx \cdot ZLx + ZCx \cdot ZLy + ZLx \cdot ZLy}{ZCx + ZLx + 2ZLy} + Rs$$

$$= \frac{j\omega Ls\left(\frac{1}{j\omega Cx} + j\omega Lx + 2j\omega Ly\right) + \frac{2}{j\omega Cx} \cdot j\omega Lx + \frac{1}{j\omega Cx} \cdot j\omega Ly + j\omega Lx \cdot j\omega Ly}{\frac{1}{j\omega Cx} + j\omega Lx + 2j\omega Ly} + Rs$$

$$= \frac{Ls\left(\frac{1}{Cx} - \omega^2 Lx - 2\omega^2 Ly\right) + \frac{2Lx}{Cx} + \frac{Ly}{Cx} - \omega^2 Lx \cdot Ly}{\frac{1}{j\omega Cx} + j\omega Lx + 2j\omega Ly} + Rs$$

$$= \frac{\frac{Ls + 2Lx + Ly}{Cx} - \omega^2(Ls \cdot Lx + 2Ls \cdot Ly + Lx \cdot Ly)}{\frac{1}{j\omega Cx} + j\omega Lx + 2j\omega Ly} + Rs$$

Here, the resonance frequency top when the capacitor C1 and the capacitor C2 are connected in parallel in the AC generation circuit 42-2 is a frequency at which the impedance Z obtained by the above Eq. (14) becomes the minimum and which becomes equal to that of the resistance component Rs. From this, it is only necessary to set the numerator portion of a first term on the right side in the above Eq. (14) to zero for the resonance frequency top. That is, it is only necessary to set the resonance frequency top such that the following Eq. (15) is established.

$$\frac{Ls + 2Lx + Ly}{Cx} - \omega p^2 (Ls \cdot Lx + 2Ls \cdot Ly + Lx \cdot Ly) = 0 \qquad (15)$$

From the above Eq. (15), the resonance frequency ωp can be obtained as in the following Eq. (16).

$$\omega p = \sqrt{\frac{Ls + 2Lx + Ly}{Cx(Ls \cdot Lx + 2Ls \cdot Ly + Lx \cdot Ly)}} \qquad (16)$$

Here, when the resonance frequency ωs and the resonance frequency ωp are compared, the resonance frequency ωs can be expressed as the following Eq. (17) and the resonance frequency ωp can be expressed as the following Eq. (18).

$$\omega s^2 = \frac{2Lx + 4Ly}{Cx(Ls \cdot Lx + 2Ls \cdot Ly + Lx \cdot Ly)} \qquad (17)$$

$$\omega p^2 = \frac{Ls + 2Lx + Ly}{Cx(Ls \cdot Lx + 2Ls \cdot Ly + Lx \cdot Ly)} \qquad (18)$$

From this, in the AC generation circuit 42-2, it is only necessary to establish the following Eq. (19) such that the resonance frequency ωs when the capacitor C1 and the capacitor C2 are connected in series is equal to the resonance frequency ωp when the capacitor C1 and the capacitor C2 are connected in parallel.

$$2Lx + 4Ly = Ls + 2Lx + Ly$$

$$3Ly = Ls \qquad (19)$$

From this, it is only necessary to set the inductance Ly of the inductor L3 in the AC generation circuit 42-2 such that the following Eq. (20) is established.

$$Ly = \frac{Ls}{3} \qquad (20)$$

This is the same as that of the AC generation circuit 42-1 of the first embodiment. That is, even in the AC generation circuit 42-2, if the inductance Ly of the inductor L3 is set to one-third of the inductance component Ls of the inductance La provided in the battery 30, the resonance frequency ωs when the capacitor C1 and the capacitor C2 are connected in series can be equal to the resonance frequency ωp when the capacitor C1 and the capacitor C2 are connected in parallel. Thereby, the capacitor C1 and the capacitor C2 are connected in series or in parallel even in the AC generation circuit 42-2, such that the current waveform of the generated AC current is made closer to a sinusoidal wave, the duty ratio of the control signal output by the controller 44 is made close to 50%, and the controller 44 can easily control each switch.

Figure 13:
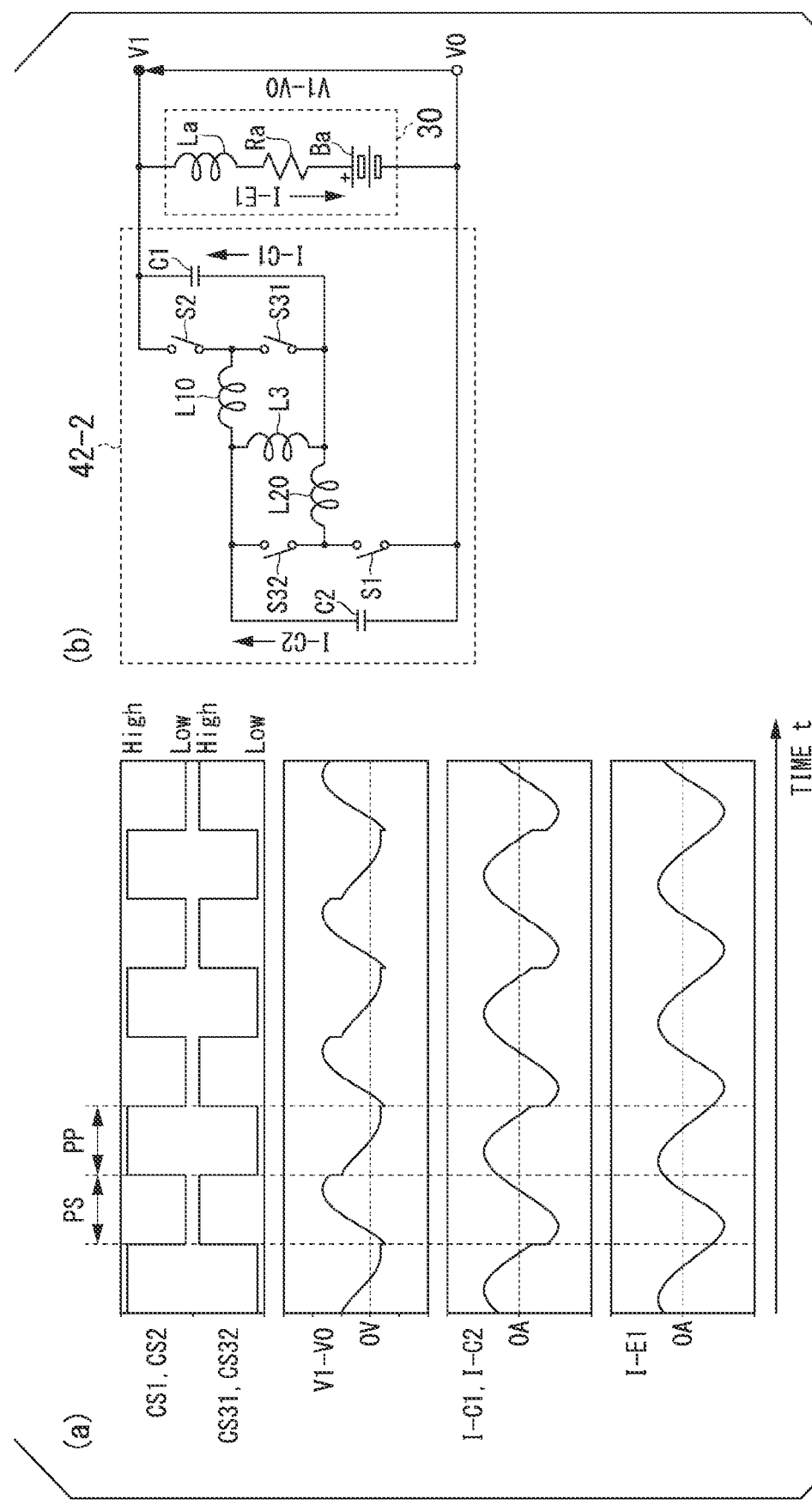
FIG. 13 is a diagram showing an example of an operation waveform of the AC generation circuit of the second embodiment.

FIG. 13 is a diagram showing an example of an operation waveform (a simulation waveform) of the AC generation circuit 42-2 of the second embodiment. Even in FIG. 13, control signals and a voltage and a current changed with the control signals are shown as in the example of the operation waveform of the AC generation circuit 42-1 shown in FIG. 8. In (a) of FIG. 13, an example of control signals output by the controller 44 and changes in a voltage V1-V0 between both electrodes of the battery 30 (including the inductance La) and a current I-C1, a current I-C2, and a current I-E1 flowing through the components, which change with the control signals, is shown. In (b) of FIG. 13, an example of a measurement position of the voltage V1-V0 and a direction in which each of the current I-C1, the current I-C2, and the current I-E1 flows is shown.

The operation waveform shown in (a) of FIG. 13 is also an example of a case where the controller 44 outputs a control signal having a duty ratio of 50% to each switch such that the AC generation circuit 42-2 is allowed to generate an AC current of a sinusoidal wave. As in the example of the operation waveform of the AC generation circuit 42-1 shown in FIG. 8, the operation waveform shown in (a) of FIG. 13 is also an example of a case where the controller 44 controls each switch without providing a dead time.

As shown in (a) of FIG. 13, in the AC generation circuit 42-2, the current I-E1 also flows mainly in the negative region when the current I-C1 and the current I-C2 flow mainly in the negative region in a series connection period PS in which the controller 44 sets the control signal CS1 and the control signal CS2 at a "Low" level and sets the control signal CS31 and the control signal CS32 at a "High" level. Thereby, the voltage V1-V0 of the AC generation circuit 42-2 rises from a negative peak voltage to a positive peak voltage. On the other hand, in the AC generation circuit 42-2, the current I-E1 also flows mainly in the positive region when the current I-C1 and the current I-C2 flow mainly in the positive region in a parallel connection period PP in which the controller 44 sets the control signal CS1 and the control signal CS2 at the "High" level and sets the control signal CS31 and the control signal CS32 at the "Low" level. Thereby, the voltage V1-V0 of the AC generation circuit 42-2 drops from the positive peak voltage to the negative peak voltage.

In this way, even in the AC generation circuit 42-2, as in the AC generation circuit 42-1, the controller 44 can output a control signal to each switch and switch the connection of the capacitor C1 and the capacitor C2 to the battery 30 to a series connection or a parallel connection, such that an AC current can be generated. Moreover, as can be seen from the waveforms of the current I-E1 and the voltage V1-V0 in each of the series connection period PS and the parallel connection period PP shown in (a) of FIG. 13, the current waveform of the AC current generated by the AC generation circuit 42-2 is closer to a sinusoidal wave than the AC current waveform generated by the AC generation circuit 42-1 shown in (a) of FIG. 8 and the amplitude thereof also has a smaller absolute value difference between the positive region and the negative region of the AC current.

In this way, even in the configuration of the AC generation circuit 42-2, as in the AC generation circuit 42-1, the duty ratio of the control signal output by the controller 44 can be set to 50% and the current waveform of the generated AC current can be made closer to a sinusoidal wave. Thereby, even in the AC generation circuit 42-2, as in the AC generation circuit 42-1, it is possible to facilitate the control of each switch in the controller 44 and raise the temperature of the battery 30 more efficiently according to the generated AC current of the current waveform close to the sinusoidal wave. In the AC generation circuit 42-2, it is possible to further reduce the noise radiated when the temperature of the battery 30 is raised by generating an AC current closer to a sinusoidal wave, i.e., an AC current obtained by further reducing the number of harmonic components.

[Another Operation of Temperature Raising Device]

Figure 14:
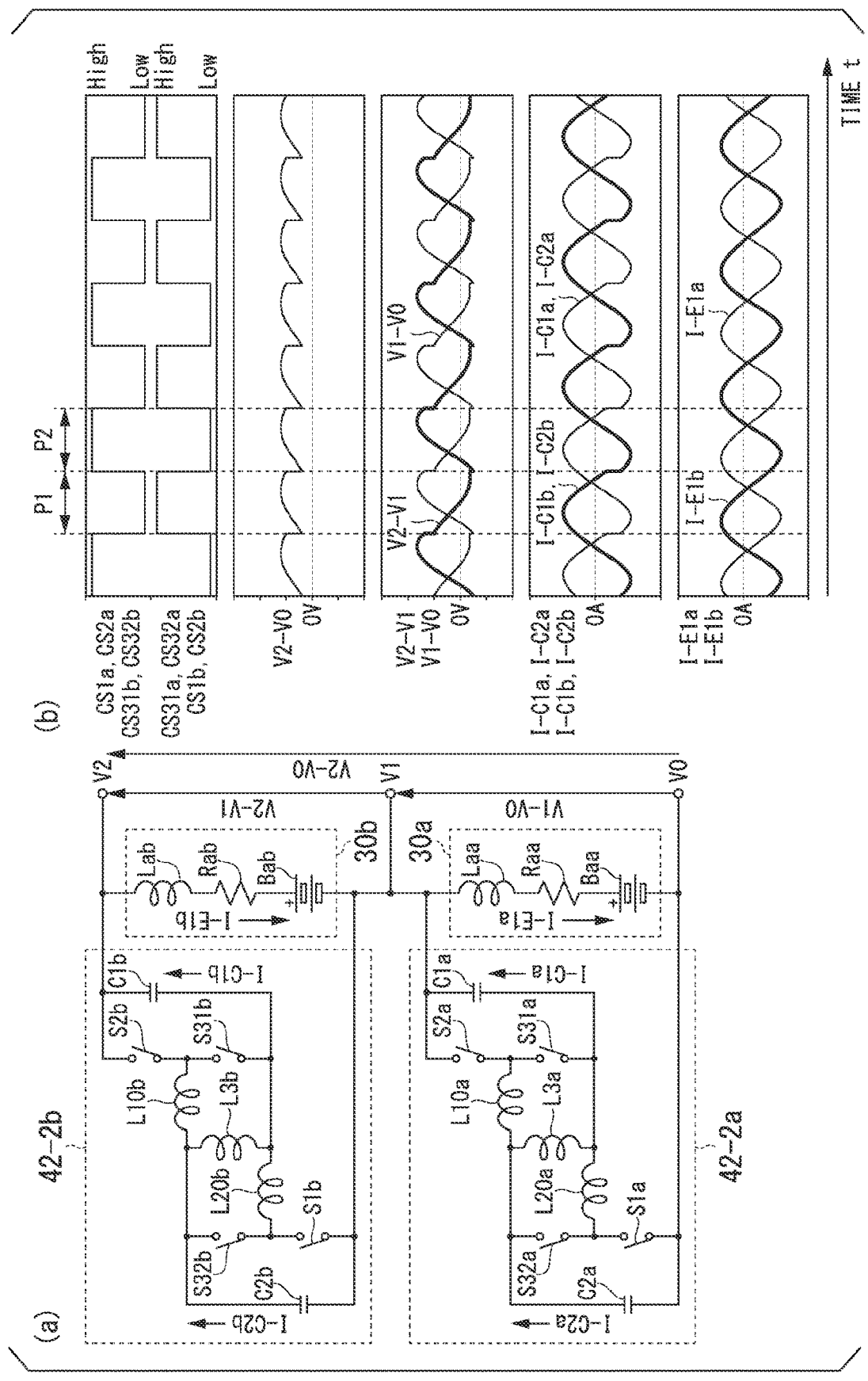
FIG. 14 is a diagram showing another example of the operation waveform of the AC generation circuit of the second embodiment.

Like the AC generation circuit 42-1, the AC generation circuit 42-2 can also be applied to a configuration in which a plurality of (for example, two) batteries 30 mounted in the vehicle 1 are combined. FIG. 14 is a diagram showing another example of an operation waveform (a simulation waveform) of the AC generation circuit 42-2 of the second embodiment. FIG. 14 is also an example of a case where the AC generation circuit 42-2 is connected to each battery 30 in a configuration in which the battery 30 mounted in the vehicle 1 is a combination of two batteries 30 (the battery 30a and the battery 30b) as in another example of the operation waveform of the AC generation circuit 42-1 shown in FIG. 9. Even in (a) of FIG. 14, a connection of the AC generation circuit 42-2 (an AC generation circuit 42-2a and an AC generation circuit 42-2b) corresponding to each battery 30 and the AC current flowing into each AC generation circuit 42-2 are shown. Even in (b) of FIG. 14, an example of changes in the control signals output to the switches by the controller 44, the AC current within each AC generation circuit 42-2, and the output voltage is shown.

As shown in (a) of FIG. 14, in the case of a configuration in which two batteries 30 are combined, the AC generation circuit 42-2a is connected to the battery 30a and the AC generation circuit 42-2b is connected to the battery 30b. The controller 44 outputs a control signal to the switch provided in each AC generation circuit 42-2 such that the phase of the AC current generated by each AC generation circuit 42-2 is shifted by 180°. Even in (b) of FIG. 14, a case where the controller 44 outputs a control signal of a duty ratio of 50% to each AC generation circuit 42-2 such that each AC generation circuit 42-2 is allowed to generate an AC current of a sinusoidal wave is shown. The control signal shown in (b) of FIG. 14 is also an example of a control signal when the controller 44 controls each switch without providing a dead time.

In this case, the operation of the AC generation circuit 42-2 and the control of the AC generation circuit 42-2 in the controller 44 are considered to be similar to the operation of the AC generation circuit 42-1 shown in FIG. 9 and the control of the AC generation circuit 42-1 in the controller 44 with reference to the operation of the AC generation circuit 42-2 shown in FIG. 13 and the control of the AC generation circuit 42-2 in the controller 44. Accordingly, detailed description of the operation of the AC generation circuit 42-2 shown in FIG. 14 and the control of the AC generation circuit 42-2 in the controller 44 will be omitted.

When the voltage waveform of the voltage V2-V0 shown in (b) of FIG. 14 is compared with the voltage waveform of the voltage V2-V0 shown in (b) of FIG. 9, it can be seen that a voltage change in the voltage V2-V0 is reduced in a case where the AC generation circuit 42-2 is applied to the configuration in which the two batteries 30 are combined as compared with the case where the AC generation circuit 42-1 is applied to the configuration in which the two batteries 30 are combined.

As described above, in the temperature raising device 40 of the second embodiment, the AC generation circuit 42-2 includes the inductor L3 having the inductance Ly, which is one-third of the inductance component Ls of the inductance La provided in the battery 30, and the inductor L10 and the inductor L20 having the same inductance Lx. In the temperature raising device 40 of the second embodiment, when the AC current based on the electric power stored in the battery 30 is generated according to the resonance operation of the inductance La provided in the battery 30 and at least the capacitor C1, a circuit of the inductor L3, the inductor L10, and the inductor L20 arranged between the capacitor C1 and the capacitor C2 is different between the case where the capacitor C1 and the capacitor C2 are connected in series and the case where the capacitor C1 and the capacitor C2 are connected in parallel. Thereby, in the temperature raising device 40 of the second embodiment, the current waveform of the generated AC current can be made closer to a sinusoidal wave, the duty ratio of the control signal output by the controller 44 can be made close to 50%, and the controller 44 can easily control each switch. Thereby, in the temperature raising device 40 of the second embodiment, it is possible to raise the temperature of the battery 30 more efficiently according to an AC current of a current waveform closer to a sinusoidal wave generated by the AC generation circuit 42-2.

Further, even in the temperature raising device 40 of the second embodiment, for example, as in the temperature raising device 40 of the first embodiment, for example, when the battery 30 mounted in the vehicle 1 has a configuration in which two batteries 30 are combined, the controller 44 can reduce the change in the entire voltage output by a combination of the two batteries 30 by performing a control process in which a phase of the AC current generated by each AC generation circuit 42-1 is shifted (shifted by 180°).

Figure 15:
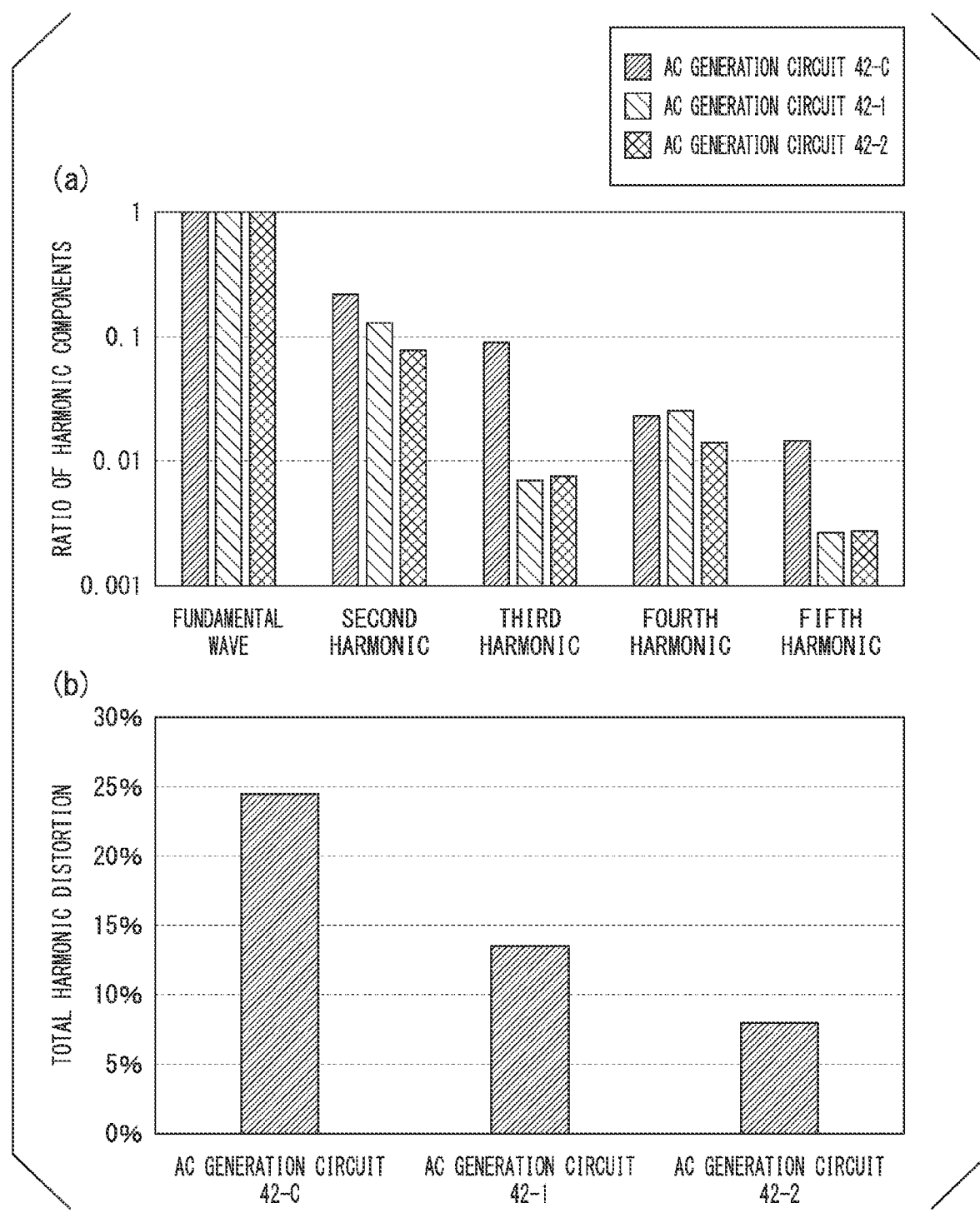
FIG. 15 is a diagram for comparing characteristics between AC currents generated by AC generation circuits.

Here, differences between characteristics of AC currents generated by the AC generation circuit 42-C of the comparative example, the AC generation circuit 42-1 of the first embodiment, and the AC generation circuit 42-2 of the second embodiment will be described. FIG. 15 is a diagram for comparing characteristics between the AC currents generated by the AC generation circuits 42 (the AC generation circuit 42-C, the AC generation circuit 42-1, and the AC generation circuit 42-2). In (a) of FIG. 15, characteristics of a ratio of harmonic components included in the current waveforms of the AC currents generated by the AC generation circuits 42 when a component of the fundamental wave of the AC current generated by each AC generation circuit 42 is normalized as "1" are shown. In (b) of FIG. 15, characteristics of harmonic distortion in current waveforms of the AC currents generated by the AC generation circuits 42 are shown. In FIG. 15, characteristics of AC currents of the current I-E1 of the AC generation circuit 42-C shown in FIG. 7, the current I-E1 of the AC generation circuit 42-1 shown in FIG. 8, and the current I-E1 of the AC generation circuit 42-2 shown in FIG. 13 are compared.

As shown in (a) of FIG. 15, a ratio of a "second harmonic," a "third harmonic," a "fourth harmonic," and a "fifth harmonic" when the component of the fundamental wave is "1" is highest in the current I-E1 generated by the AC generation circuit 42-C and lower in the currents I-E1 generated by the AC generation circuit 42-1 and the AC generation circuit 42-2. In particular, in the AC generation circuit 42-1 and the AC generation circuit 42-2, the third to the fifth harmonics are lower. Then, as shown in (b) of FIG. 15, the harmonic distortion in the current waveform of the current I-E1 generated by each AC generation circuit 42 is also greatest in the current I-E1 generated by the AC generation circuit 42-C and less in the order of the current I-E1 generated by the AC generation circuit 42-1 and the current I-E1 generated by the AC generation circuit 42-2.

From these facts, it can be seen that the current I-E1 (the AC current) with the reduced number of harmonic components or the reduced harmonic distortion can be generated as compared with the AC generation circuit 42-C in the AC generation circuit 42-1 and the AC generation circuit 42-2. This is because the AC generation circuit 42-1 and the AC generation circuit 42-2 include the inductor L3 and therefore the current waveform of the generated current I-E1 (the AC current) becomes a current waveform closer to a sinusoidal wave. Further, it can be seen that the AC generation circuit 42-2 can generate the current I-E1 (the AC current) having less harmonic distortion than the AC generation circuit 42-1. This is because the AC generation circuit 42-2 further includes the inductor L10 and the inductor L20 and therefore the current waveform of the current I-E1 (the AC current) generated thereby is closer to the sinusoidal wave than the current waveform of the current I-E1 (the AC current) generated by the AC generation circuit 42-1.

As described above, according to the temperature raising device 40 of each embodiment, the AC generation circuit 42 includes an inductor L3 having an inductance Ly that is one-third of the inductance component Ls of the inductance La provided in the battery 30. In the temperature raising device 40 of each embodiment, an AC current based on electric power stored in the battery 30 is generated using a resonance operation of alternately exchanging magnetic energy stored in the inductance La provided in the battery 30 and at least electrostatic energy stored in the capacitor C1 by switching the connection of the capacitor C1 and the capacitor C2 provided in the AC generation circuit 42 to the battery 30 to the series connection or the parallel connection. At this time, in the temperature raising device 40 of each embodiment, at least when the capacitor C1 and the capacitor C2 provided in the AC generation circuit 42 are connected to the battery 30 in parallel, the inductor L3 is arranged between the capacitor C1 and the capacitor C2. Thereby, in the temperature raising device 40 of each embodiment, the current waveform of the AC current generated by the AC generation circuit 42 becomes a current waveform closer to a sinusoidal wave. Thereby, in the temperature raising device 40 of each embodiment, the temperature of the battery 30 can be raised more efficiently due to the AC current having a current waveform close to the sinusoidal wave generated by the AC generation circuit 42. Thereby, in the vehicle 1 in which the temperature raising device 40 of each embodiment is adopted, the battery 30 can be used in a state in which the temperature of the battery 30 is raised to a suitable temperature and the deterioration of charging/discharging performance of the battery 30 can be limited. Further, in the vehicle 1 in which the temperature raising device 40 of each embodiment is adopted, because the number of harmonic components provided in the alternating current generated by the AC generation circuit 42 is small, the noise radiated when the temperature of the battery 30 is raised can be reduced.

By the way, a case where the inductance Ly of the inductor L3 provided in the AC generation circuit 42 (the AC generation circuit 42-1 or the AC generation circuit 42-2) has a value which is one-third of the inductance component Ls of the inductance La provided in the battery 30 in the temperature raising device 40 of each of the above-described embodiments has been described. However, it is assumed that the inductance component Ls of the inductance La provided in the battery 30 has variations in characteristics even if the batteries 30 of the same type are used. Further, it is assumed that a wiring portion for connecting the AC generation circuit 42 and the battery 30 also includes an inductance component. Thus, in the temperature raising device 40 of each embodiment, the inductance Ly of the inductor L3 provided in the AC generation circuit 42 has a value considering the variation of the inductance component Ls of the inductance La provided in the battery 30 and the inductance component included in the wiring portion for connecting the AC generation circuit 42 and the battery 30. That is, in the temperature raising device 40 of each embodiment, the inductance Ly of the inductor L3 may be set to a value having a certain width with respect to a value that is one-third of the inductance component Ls of the inductance La provided in the battery 30 within a range in which the current waveform of the AC current generated by the AC generation circuit 42 can be regarded as a sinusoidal wave (a range in which a substantial effect can be obtained). In other words, in the temperature raising device 40 of each embodiment, it is only necessary to set the inductance Ly of the inductor L3 provided in the AC generation circuit 42 to a value of a range in which the inductance Ly can be set to one-third of the substantial inductance component Ls of the inductance La provided in the battery 30, i.e., a range in which the inductance Ly can be set to approximately one-third of the substantial inductance component Ls of the inductance La provided in the battery 30. For example, in the temperature raising device 40 of each embodiment, the inductance Ly of the inductor L3 provided in the AC generation circuit 42 may be set to a value of a range having a width from one-fourth to two-fifths of the inductance component Ls of the inductance La provided in the battery 30.

In the temperature raising device 40 of each of the above-described embodiments, a case where the duty ratio of the control signal output to each switch by the controller 44 is 50% has been described. However, as described above, the controller 44 may control the switch by providing a dead time for setting all the switches in the non-conductive state between a period in which the switch is set in the conductive state and a period in which the switch is set in the non-conductive state. For example, in the temperature raising device 40 of each embodiment, the connection of the capacitor C1 and the capacitor C2 to the battery 30 may be switched from the parallel connection to the series connection or vice versa by setting the duty ratio of the control signal output to each switch to a value (for example, a prescribed value between 45% and 55% or the like) capable of being regarded as approximately 50% and providing the dead time and outputting the control signal to each switch.

According to the temperature raising device 40 of each of the above-described embodiments, the AC generation circuit 42 for raising the temperature of the battery 30 by generating an AC current based on electric power stored in the battery 30 having the inductance La includes the capacitor C1 having a first end connected to a positive electrode side of the battery 30; the capacitor C2 having a first end connected to a negative electrode side of the battery 30; a parallel switch unit configured to connect the capacitor C1 and the capacitor C2 to the battery 30 in parallel by connecting a second end of the capacitor C1 and the first end of the capacitor C2 and connecting the first end of the capacitor C1 and a second end of the capacitor C2 in accordance with a first control signal (for example, the control signal CS1 and the control signal CS2); a series switch unit configured to connect the capacitor C1 and the capacitor C2 to the battery 30 in series by connecting the second end of the capacitor C1 and the second end of the capacitor C2 in accordance with a second control signal (for example, the control signal CS3); and the inductor L3 connected between both terminals of the series switch unit, whereby it is possible to raise the temperature of the battery 30 for traveling mounted in the vehicle 1. Thereby, in the vehicle 1 in which the temperature raising device 40 of each embodiment is adopted, the battery 30 can be used in a state in which the temperature of the battery 30 is raised to a suitable temperature and the deterioration of the charging/discharging performance of the battery 30 can be limited. Thereby, in the vehicle 1 equipped with the temperature raising device 40 of each embodiment, it is possible to improve the marketability of the vehicle 1 such as the improvement of durability. From these facts, the vehicle 1 equipped with the temperature raising device 40 of each embodiment is expected to contribute to improving energy efficiency and reducing adverse effects on the global environment.

In each of the above-described embodiments, a configuration in which the control device 100 controls the activation or stopping of the temperature raising device 40 and the controller 44 controls each switch provided in the AC generation circuit 42 such that the switch is in the conductive state or the non-conductive state has been described. The operation of the controller 44 may be implemented when a hardware processor such as a CPU provided in the controller 44 executes a program. The function of the control device 100 may include the function of the controller 44 described above. In this case, the controller 44 may be omitted in the temperature raising device 40.

Although modes for carrying out the present invention have been described using embodiments, the present invention is not limited to the embodiments and various modifications and substitutions can also be made without departing from the scope and spirit of the present invention.

What is claimed is:

1. An alternating current (AC) generation circuit for raising a temperature of a power storage by generating an AC current based on electric power stored in the power storage having an inductance component, the AC generation circuit comprising:
   a first capacitor having a first end connected to a positive electrode side of the power storage;
   a second capacitor having a first end connected to a negative electrode side of the power storage;
   a parallel switch unit configured to connect the first capacitor and the second capacitor to the power storage in parallel by connecting a second end of the first capacitor and the first end of the second capacitor and connecting the first end of the first capacitor and a second end of the second capacitor in accordance with a first control signal;
   a series switch unit configured to connect the first capacitor and the second capacitor to the power storage in series by connecting the second end of the first capacitor and the second end of the second capacitor in accordance with a second control signal; and
   an inductor connected between both terminals of the series switch unit.

2. The AC generation circuit according to claim 1, wherein the parallel switch unit includes
   a first switch having a first terminal connected to the second end of the first capacitor and a second terminal connected to the first end of the second capacitor; and
   a second switch having a first terminal connected to the first end of the first capacitor and a second terminal connected to the second end of the second capacitor,
   wherein the series switch unit includes a third switch having a first terminal connected to the second end of the second capacitor and a second terminal connected to the second end of the first capacitor, and
   wherein the inductor is connected in parallel between the first terminal of the third switch and the second terminal of the third switch.

3. The AC generation circuit according to claim 2, wherein inductance of the inductor is approximately one-third of the inductance component.

4. The AC generation circuit according to claim 1,
   wherein the parallel switch unit includes
   a first switch having a first terminal connected to the second end of the first capacitor and a second terminal connected to the first end of the second capacitor; and
   a second switch having a first terminal connected to the first end of the first capacitor and a second terminal connected to the second end of the second capacitor,
   wherein the series switch unit includes
   a third switch having a first terminal connected to the second end of the second switch and a second terminal connected to the second end of the first capacitor; and
   a fourth switch having a first terminal connected to the second end of the second capacitor and a second terminal connected to the first terminal of the first switch, and
   wherein the inductor includes
   a first inductor having a first end connected to the first terminal of the fourth switch and a second end connected to the second terminal of the third switch;
   a second inductor having a first end connected to the first end of the first inductor and a second end connected between the second terminal of the second switch and the first terminal of the third switch; and
   a third inductor having a first end connected between the first terminal of the first switch and the second terminal of the fourth switch and a second end connected to the second end of the first inductor.

5. The AC generation circuit according to claim 4, wherein inductance of the first inductor is approximately one-third of the inductance component.

6. The AC generation circuit according to claim 5, wherein inductance of the second inductor is equal to inductance of the third inductor.

7. The AC generation circuit according to claim 1, wherein the inductance component includes an inductance component provided in a wiring portion between the power storage and the AC generation circuit.

8. A temperature raising device comprising:
   the AC generation circuit according to claim 1; and
   a controller configured to output a signal of a prescribed duty ratio for setting the parallel switch unit in a conductive state or a non-conductive state as the first control signal, output a signal of the prescribed duty ratio for setting the series switch unit in the conductive state or the non-conductive state as the second control signal, and alternately switch the state between a first state in which the parallel switch unit is in the conductive state and the series switch unit is in the non-conductive state and a second state in which the parallel switch unit is in the non-conductive state and the series switch unit is in the conductive state according to the first control signal and the second control signal.

9. The temperature raising device according to claim 8, wherein the prescribed duty ratio is approximately 50 percent.

* * * * *